US006995666B1

(12) United States Patent
Luttrell

(10) Patent No.: US 6,995,666 B1
(45) Date of Patent: Feb. 7, 2006

(54) CELLEMETRY-OPERATED RAILROAD SWITCH HEATER

(76) Inventor: Clyde K. Luttrell, 7749 Donegal Dr., Huntsville, AL (US) 35802

( * ) Notice: Subject to any disclaimer, the term of this patent is extended or adjusted under 35 U.S.C. 154(b) by 155 days.

(21) Appl. No.: 10/613,430

(22) Filed: Jul. 3, 2003

Related U.S. Application Data

(60) Provisional application No. 60/418,922, filed on Oct. 16, 2002.

(51) Int. Cl.
*H04Q 7/00* (2006.01)

(52) U.S. Cl. .............................. 340/539.1; 340/539.11; 340/3.1

(58) Field of Classification Search ............. 340/539.1, 340/539.11, 3.1; 246/220, 428; 200/52 R
See application file for complete search history.

(56) References Cited

U.S. PATENT DOCUMENTS 4,703,327 A * 10/1987 Rossetti et al. ............... 342/44
5,348,257 A * 9/1994 Ocampo ..................... 246/220
5,873,043 A 2/1999 Comer et al.
6,014,089 A 1/2000 Tracy et al.
6,072,874 A 6/2000 Shin et al.
6,108,537 A 8/2000 Comer et al.
6,178,337 B1 1/2001 Spartz et al.
6,393,297 B1 5/2002 Song
6,571,093 B1 5/2003 Jarrett, Jr.
6,681,110 B1 1/2004 Crookham et al.
6,718,177 B1 4/2004 Comer et al.

* cited by examiner

*Primary Examiner*—Daryl C. Pope
(74) *Attorney, Agent, or Firm*—Mark Clodfelter

(57) ABSTRACT

A system for monitoring a sensor or switch for operation is disclosed. The switch or sensor is coupled to a CELLEMETRY™ transmitter for sending electronic serial numbers (ESNs) encoded with information, and receiving mobile identification numbers (MINs), also encoded with information, in accordance with the CELLEMETRY™ protocol. A microprocessor controls operation of the combination of the radio and sensor or switch. A computerized control center coupled to the Internet provides a connection medium between the cellular system and the control center. When a sensor or switch so connected operates, the radio sends an ESN via the control channels of the cellular system to the Internet, where the ESN is relayed to the control center. There, processing occurs that provides notification to an entity associated with the sensor or switch. Communications from the control center to the radio associated with a sensor are via MIN numbers, and may initiate operation of a device coupled to the sensor.

16 Claims, 25 Drawing Sheets

Flow Chart - RM Server initiation

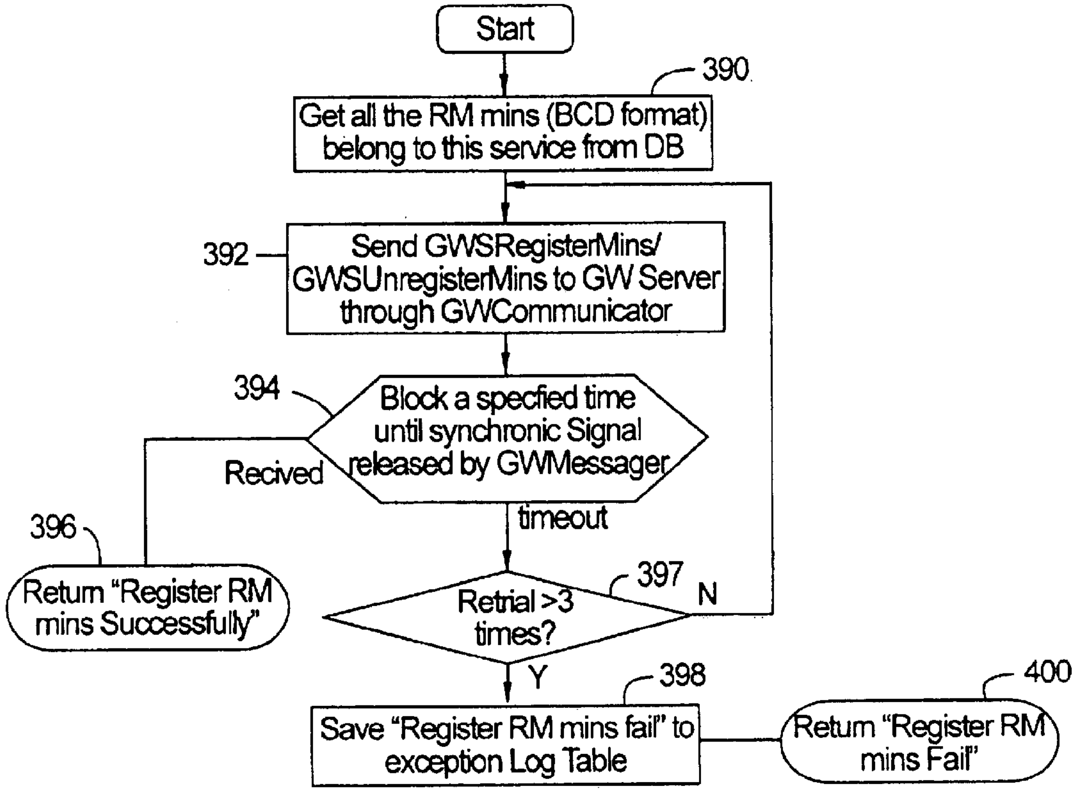
Fig. 9f
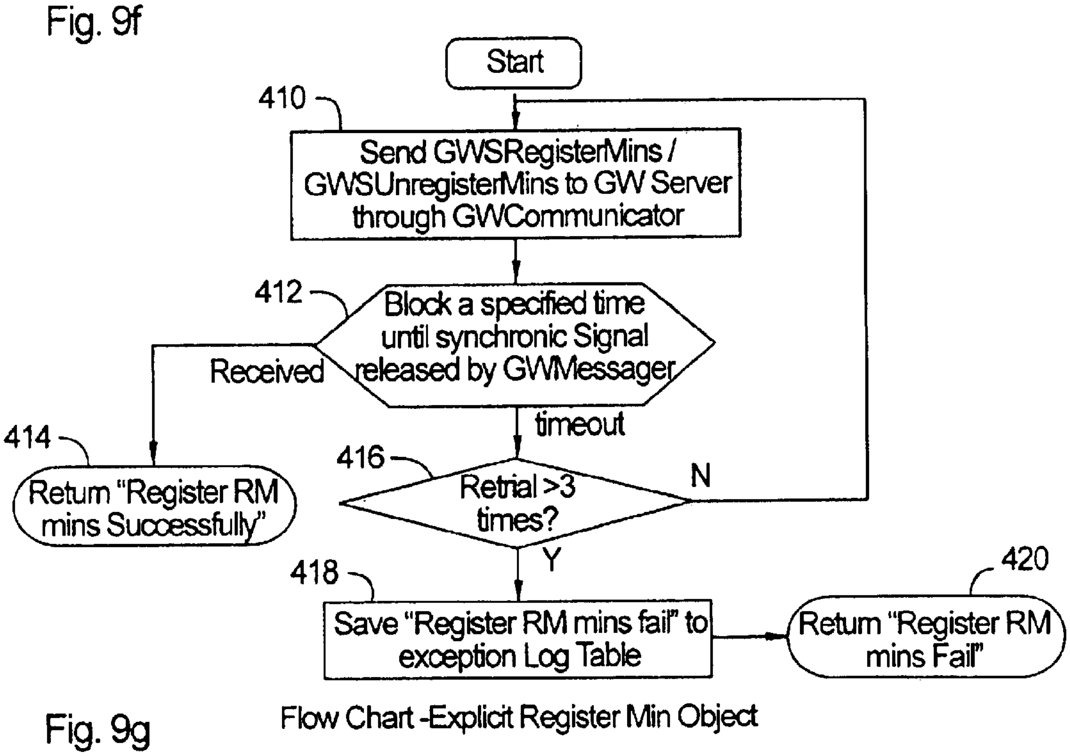
Fig. 9g Flow Chart -Explicit Register Min Object

CELLEMETRY-OPERATED RAILROAD SWITCH HEATER

CROSS REFERENCE TO RELATED APPLICATIONS

This application claims the benefit of provisional application Ser. No. 60/418,922, filed Oct. 16, 2002.

FIELD OF THE INVENTION

This invention relates to electrical heaters for melting ice and snow between a movable portion and stationary portions of railroad track switches, and particularly to a computerized system including Cellemetry™ communications for remotely activating and deactivating such heaters. The computerized system of the instant invention may also be easily adapted for other applications, such as surveillance systems, automated water, gas and electric meter reading, prepaid utilities systems, electrical capacitor bank switching and other applications wherein a switch closure is monitored, switch closure or openings are affected and/or relatively small amounts of data, such as a meter reading, are passed to a central location.

BACKGROUND OF THE INVENTION

Railroad track switches function to direct railroad locomotives and cars from one set of tracks to another. The switches are generally constructed of a pair of movable tracks that direct locomotives and cars from one set of tracks to one set of a second and third set of tracks. In order to effect a smooth coupling for railroad locomotives and railroad cars to the second or third set of tracks, beveled ends of the movable tracks must closely abut to the fixed second or third set of tracks.

Problems arise in cold weather when it rains or snows. Ice may form between the rails of the movable portions of track and the stationary portions of track so that the movable set of tracks are unable to be brought into close, abutting relation with the set of tracks to which the train is to be routed, this situation presenting a risk of derailment of the cars or locomotive and causing additional wear and tear of the railroad switch components. Likewise, snow, when the movable tracks are moved between the second and third set of tracks, may become compressed between the fixed and movable sets of tracks and again may prevent direct abutting contact between the fixed and movable sets of tracks.

To overcome the problem of ice and snow preventing abutting contact between the movable set of tracks and fixed set of tracks, heating elements are generally mounted either to each track of the movable set of tracks or to both tracks of each of the fixed set of tracks. The heating elements are generally energized in anticipation of snowy or icy weather so that the tracks to which the heaters are affixed are sufficiently heated to melt any snow or ice that accumulates between the movable set of tracks and either of the fixed set of tracks within a few seconds. In most instances, about 30 minutes or so of preliminary heating time of the tracks is required to sufficiently melt the ice and snow.

In turn, use of these heaters presents other problems. Where the track switches are located in a railroad switch yard, such as found in subway systems, there may be 50 or 60 railroad switches or so having heaters that need to be energized. Many subways use a third rail to carry electricity, some using 600 VDC and others using 750 volts DC, with virtually all using potentials between about 480 VDC to about 750 VDC for powering the individual trains, this third rail running between the pair of tracks the locomotive and cars ride on. With electrical switches for energizing the heaters located adjacent a respective railroad switch, it is a hazardous job, particularly in bad weather, for an individual to walk around a switch yard and activate the heaters for each railroad switch. Notably, several people have been electrocuted while walking about a railroad switch yard activating or deactivating such railroad switch heaters. In addition energizing the heaters is time-consuming, typically requiring 1–1.5 hours for one person to energize all the heaters in a switch yard with 50–60 sets of heaters. Also, as described, each heater typically takes about 30 minutes or so to sufficiently heat the track portion to which it is attached in order to adequately melt ice and snow. Thus, if not initiate sufficiently in advance freezing weather, the heated portions of the railroad switches may not become hot enough to melt snow and ice contacting the railroad track switches. In addition, where a heater is bad when switched ON, there is nothing to indicate that the heater is bad unless someone happens to report that the snow or ice is not melting from that railroad switch or a derailment or other problem occurs. Further, it is even more hazardous to de-energize the heaters after a snow and/or ice storm. Here, the person responsible for turning OFF the heaters must negotiate many pairs of rails each having the third, current-carrying rail therebetween. While the switches will be clear of ice and snow because of the heaters, the rest of the tracks may be covered with a blanket of snow, making it difficult to see the third rail. In this instance, rather than risk the life of a maintenance person to de-energize the heaters, the heaters may be simply left ON until most of the ice and snow is cleared from the tracks. Unfortunately, this has a deleterious effect on the heaters, causing many to burn out prematurely. As these heaters are expensive, particularly constructed ceramic heaters, anything that extends their service life would be particularly advantageous for switchyard operators. In addition, the instant invention, in computerized form, is easily modified to be adapted to other applications. In the railroad switch heater application, the system opens and closes switch contacts, and monitors basic status of the heaters, i.e. if they are open or shorted, and passes this information back to a central location. In other applications, the system may be used in a surveillance system, as to pass information such as a switch closure or output of an intrusion detection device, such as a motion detector, back to the central location. In another application, data from water, gas and electrical meters may be sent to a central location for automated reading and prepaid systems. Also with respect to utility companies, capacitor bank switching for power factor balancing may be effected and monitored, if along with automatically detecting affected areas of electrical power failures. Here, one service that may be performed is notifying and owner of a residence or business that his/for power as failed, at what time and for how long. In another application relating to personal security, a small, conveniently carried "panic button" device may be constructed using a Cellemetry™ radio and small processor to detect activation of a panic button, with this information transmitted within a few seconds to another individual or a security company or organization. Such a panic button device may be incorporated with a GPS sensor in order to also transmit location of an attack, and may also the fixed in the vehicle, such as an automobile, bus, truck or airplane. Once activated such a device may transmit its location on a periodic basis, such as once a minute or so. This type of device would facilitate law-enforcement officials in finding stolen vehicles, kidnapped victims, people who are being "mugged" and the like.

In addition to the above, it is increasingly prevalent that railroad cars carrying tractor trailers and other cargo containers are being broken into by thieves and merchandise therein stolen. As it is not uncommon for such railroad cars to be left idle in a railroad yard, which is a large facility, or on a siding in the middle of nowhere overnight or sometimes for a few days, it is relatively easy for thieves to target containers marked with logos from well-known electronics, drug and other corporations. Here, I propose to fit such trailers and cargo containers with a battery-powered intrusion detection system that may include any intrusion detector, such as a sensor for detecting when a door or other entry is opened or a motion sensor, coupled to a GAS sensor. Today, such GPS sensors, along with positional information, may also provide an identification signature. This positional information and signature, along with an intrusion indication, may be applied to a CELLEMETRY™ radio as described herein and transmitted to a local cellular tower for passage to my system. Appropriate law enforcement authorities and others may then be notified as appropriate. In addition, the intrusion system in the cargo container may activate a visible or audible alarm.

Accordingly, it is one object of this invention to provide a system for collecting relatively small amounts of data from remote places and transmitting such data to a central location and to effect or detect switch closures at such remote locations. The central location may be a service company that receives data from a number of diverse sources, such as water, gas and electrical meters, surveillance systems, railroad switch heaters etc., and distributes this information to respective end-user customers, such as utility companies, surveillance system companies and railroad operators. Also, the system itself may be leased or sold to such an end user company. More specifically, the instant invention provides for selectively energizing and de-energizing railroad switch heaters through the use of computerized switching and Cellemetry™ thus eliminating the need for an individual to manually energize or de-energize each set of heaters. It is a further object of the invention to provide a system that can energize some or all of the railroad switches in a switchyard safely and in a very short time so that the switches can become heated just ahead of a rapidly moving or sudden ice or snow storm. It is yet another object of the invention to provide such a system that allows some or all of the heaters to be de-energized safely and on an almost immediate basis so that the heaters are in use only when they are needed. Other objects of the invention will become apparent upon a reading of the following appended specification.

BRIEF DESCRIPTION OF THE DRAWINGS

FIGS. 9*a*–1 and 9*a*–2 together form a software flow diagram illustrating, by way of example, a process of the instant invention for receiving registrations from remote modules.

FIG. 9*f* is a software flow diagram illustrating, by way of example, a process of the instant invention by which a batch of MIN numbers are registered.

FIG. 9*g* is a software flow diagram, illustrating, by way of example, a process of the instant invention adding or deleting a MIN number.

DETAILED DESCRIPTION OF THE DRAWINGS

Figure 1:
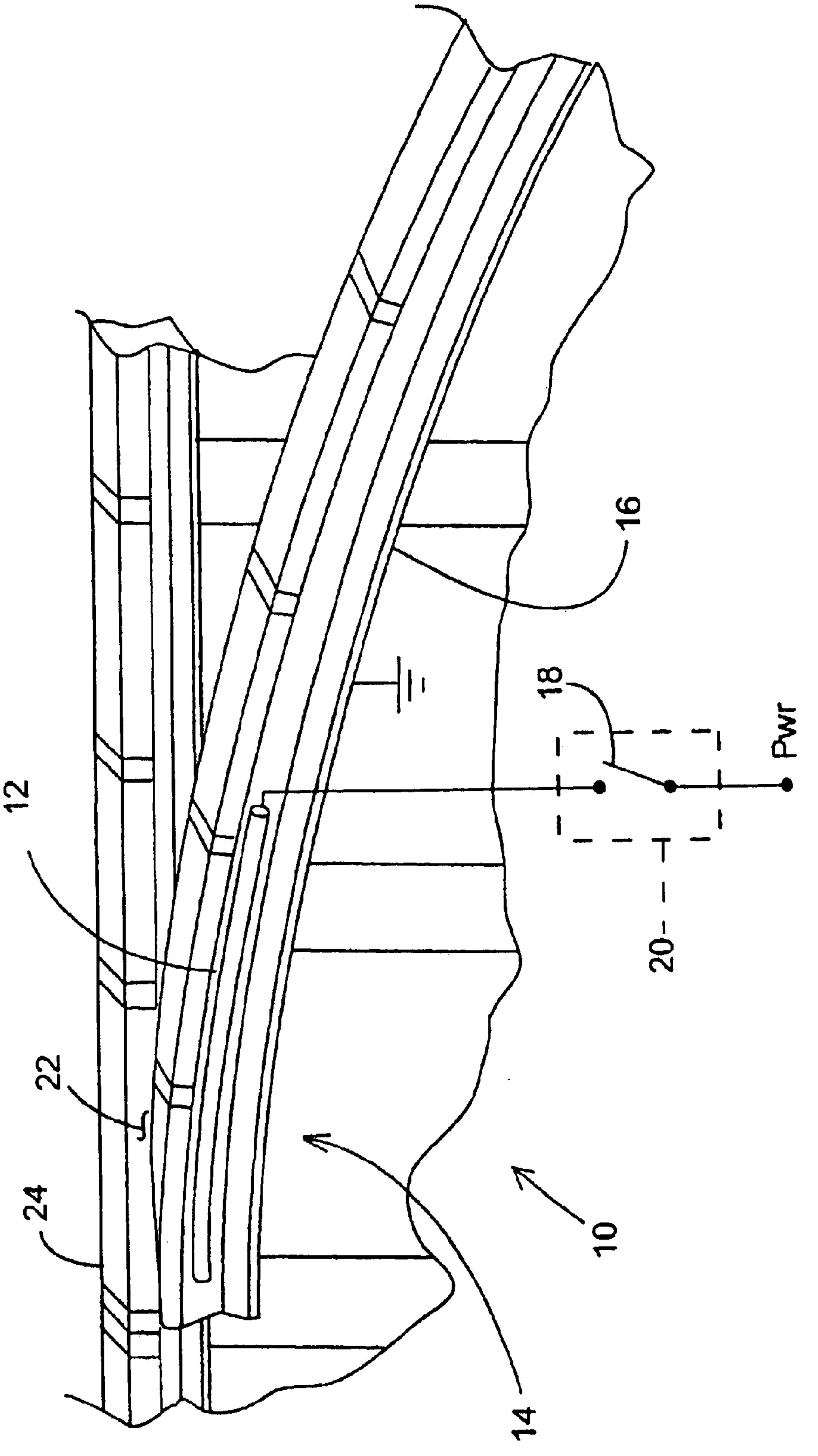
Fig. 1 Prior Art
FIG. 1 is a generally diagrammatic view of a single track of a pair of railroad tracks equipped with a heater for melting ice and snow.

Generally, this application is directed to a computer-based system for a service company that provides services for managing assets that otherwise would require intervention or actions by personnel, such as railroad switch heater systems as described above, and other applications such as gas, water and meter reading. In other instances, such as surveillance for water storage tanks, water inlets at water reservoirs or other such critical areas that are difficult to monitor, or for monitoring switching of capacitor banks for power factor balancing, automated monitoring or detection equipment may be located at such remote places that communicate back to the service company or directly to the utility company or other end user that has an account with the service company. Such monitoring or switching occurs through the use of remote modules as described in provisional application Ser. No. 60/418,922, filed Oct. 16, 2002, and which is incorporated herein by reference in its entirety. Communications between the service company and remote modules may occur through combinations that include Cellemetry™, IS-41 network and the Internet.

In general, Cellemetry™ operates in a similar manner as a roaming cellular telephone. When a roaming cell phone is initially turned ON, it sends its mobile identification number (MIN) and an electronic serial number (ESN) to a local cellular tower via a control channel. Data in the MIN number tells the local cellular switch where the home system is for that cell phone and enables the local system to communicate with the cell phone's home system via a network known as the SS7 network. This network interconnects all cellular switching centers in North America together. After validating the MIN and ESN of the roaming cell phone over the SS7 network, a voice channel for that cell phone is enabled, allowing the user to use the cellular telephone.

Cellemetry is similar in that when a message or command is sent to a remote CELLEMETRY™ radio or when a Cellemetry™ radio transmits, communication only occurs over the control channels. These channels are superior in that they are digital as opposed to the analog voice channels, and they are operated at higher power levels. Also, cost of using the control channels is much less than using the voice channels. Thus, when a remote CELLEMETRY™ unit is activated to send a messages, it sends its MIN and ESN numbers to a local cell tower and associated switching center, where the number is routed via the SS7 network, not to a cellular home system but to a CELLEMETRY™ gateway computer coupled to the SS7 network. The gateway computer associates data in the MIN and ESN with a particular user and forwards the MIN and ESN to that user via the Internet, although land lines or other transmission mediums, such as wireless and optical mediums may also be used. As such, the MIN and ESN numbers assigned to the remote CELLEMETRY™ units are particularly coded so that they are recognized by the SS7 network and CELLEMETRY gateway, and routed accordingly. Similarly, when a message is sent to a CELLEMETRY™ remote unit, the MIN number is sent from a service or other company via the Internet to the CELLEMETRY™ gateway where the MIN number is placed on the SS7 network, and in turn passed to the local switching center and associated cellular tower, where the MIN number for the remote unit is transmitted. In my system, a pair of MIN numbers may be transmitted, the first of which being a command MIN that requires a specific action, such as to turn a railroad switch heater ON or OFF and the second, subsequent MIN identifying which of one or more of the remote units to perform the action. It should be noted that MIN numbers are passed to the cellular system in the form of cellular pages, with each page having a capacity of up to 9 MIN numbers. Thus, up to 9 MIN numbers for remote devices may be transmitted in a single page.

Programming of the MIN numbers into a radio portion of the remote units may be accomplished via a port, such as an RS-232 port, and in a format as defined by NUMEREX™. In general, each Cellemtry™ radio may recognize up to ten MIN numbers, including a unique "default" MIN number similar to a telephone number that is unique, and associated only with a one of the radios in that particular location. Another of the MIN numbers may be a global command number that causes all the remote units to operate synchronously, i.e. turn ON or OFF together. Thus, to operate all the railroad switch heaters ON or OFF simultaneously, a single command MIN (ON or OFF) is transmitted, followed by a second MIN number that all the remote units recognize as an activation command. Where a single railroad switch heater pair is to be activated, the command MIN to turn ON or OFF is transmitted followed by the default MIN recognized only by the remote unit associated with the heater pair to be energized or deenergized.

Structure of the MIN numbers and ESN numbers necessary for programming and addressing the remote units is defined by NUMEREX™ and the cellular protocol, as should be apparent by any individual skilled in the respective arts. However, it should be noted that these are fields in both MIN numbers and ESN numbers wherein the user may devise any scheme necessary for reception and transmission of data as described herein. Such a scheme should also be well within the skills of an average programmer.

Within the service company, there maybe three types of users. At the lowest level, a level at which users are granted the least access to the system, are end users such as the system operators in utility systems and surveillance companies, or operators in utility companies that operate subway systems having switchyards in areas subject to freezing weather. Here, such access may be used to energize or de-energize railroad switch heaters, read water, gas and electrical meters of utility customers, maintain a database of utility customers and in some instances implement a prepaid utility system for economically challenged utility customers. At a higher level of access, clients such as utility companies and subway operators may be responsible for installation, maintenance and control of all remote control devices deployed by a client utility or other company. With respect to railroad heater switches, such a client user may be responsible for installation, maintenance and operation of remote units that allow remote control operation of the railroad switch heaters. At a highest level of access are service company administrators and users that initialize, operate and maintain services provided to the client companies. Such service company users and administrators manage accounts of the utility systems and companies, and also manage Internet and Cellemetry™ accounts through which remote devices communicate with the service provider.

In general, my system is a multi-user, multi-application and multi-service integrated management system. As such, multiple, diverse client companies may conveniently use the service, and including the aforestated monitoring of water storage tanks, reservoirs and associated inlets, electric, water and gas meter reading, capacitor bank switching, asset monitoring, railroad switch heater control; etc. Monitoring and management of such diverse services may be integrated into one platform that may use Cellemetry™ networks and the Internet for communications between the service company computer system, remote modules and end-user customers and companies. At a service company, the system may perform inventory management, customer management, billing management and network diagnostics. For an end-user utility company or other such user, the system functions to provide information related to device and service management.

In the instant application, the service company provides a service to companies and organizations utilizing rail travel or the like, such as subway systems. In these systems, and as stated, there are railroad switching yards that enable locomotives and towed cars to switch tracks by employing railroad switches that if not heated during cold weather, may be jammed by ice and snow, presenting a risk of derailment.

As described in the referenced and incorporated provisional application, there are some user operations that will trigger the system to send one or more MIN numbers, or pages, to one or more dedicated remote units that control or monitor the end user's equipment. Such an operation begins with the delivering of a request for data or a command from a computer, such as a web server, which may be a client or service company web server. In the instance of a client company, the web server may be physically located at a control center of the client company, or may be at a central location of the service company. For smaller end user companies, all that is required for an end user company to connect to my service provider system is a computer coupled to the Internet, and a conventional browser. Commands or requests for data are sent from the end user company to the web server and remote module server located in the service company system, and which is sent via the Internet, gateway server and cellular system to a remote module. The request or command is processed and issued as a MIN number via the Cellemetry™ network to the remote module. Responsive to the commands or request for data, the remote module sends a registration containing the ESN, also via the Cellemetry™ network, back to the service company system through the gateway server and Internet. A registration handler program or module in my system receives registration packets returned by the gateway server and processes them.

Referring initially to FIG. 1, a prior art system including a portion 10 of a railroad switch is shown. Conventionally, where the railroad switches are subject to freezing weather, a heater 12 is affixed to a forward portion 14, commonly known as a "point", of movable portions 16 of track forming the railroad switch. In other instances, heaters may be attached to each of the sections of stationary track. A source of electrical power, which in the case of an electrically powered subway system may be the same DC potential that is provided to the third rail between the tracks, is coupled via a switch 18 to heater 12. Switch 18 is mounted in a terminal box 20 (dashed lined adjacent the railroad switch, with box 20 being suitably constructed for use in a harsh environment such as that found around railroad tracks. As described in the foregoing, in order to energize heater 12 in preparation for weather that may produce ice and snow, box 20 must be opened and switch 18 manually closed to apply electrical power to heater 12. Heater 12 then heats tracks of the entire point 14 so that any snow or ice trapped in region 22 between point 14 and rail 24 is immediately melted when the railroad switch is moved so that point 14 contacts rail 24.

Figure 2:
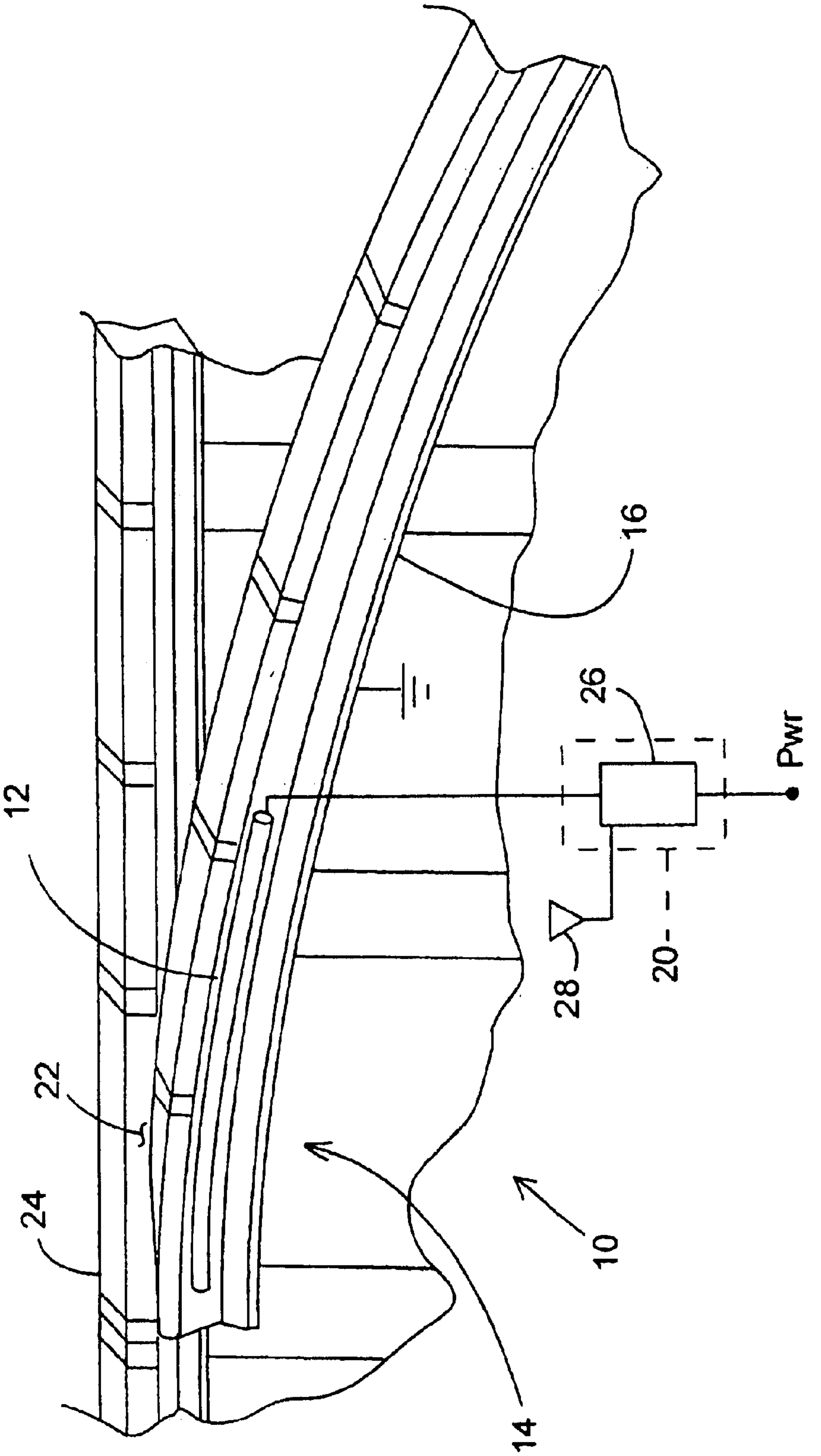
FIG. 2 is a generally diagrammatic view similar to FIG. 1 showing how the prior art is modified with my invention.

Referring to FIG. 2, the portion 10 of the railroad switch as shown in FIG. 1 is depicted as being modified with my invention. Here, a Cellemetry™ transceiver and heater controller are integrated into a remote unit 26 that is mountable in box 20. An antenna 28 from unit 26 extends to an exterior of box 20. Unit 20 is similar to or the same as the Cellemetry™ transceiver and controller as disclosed in my provisional patent application Ser. No. 60/418,922 as referenced above and which is incorporated by reference in its entirety herein. As such, unit 26 receives MIN numbers from a cellular telephone tower via the Cellemetry™ system for energizing or de-energizing heater 12, unit 26 also providing status information as to operation and condition of the heaters back to the cellular telephone tower via registration (ESN) signals.

Figure 3:
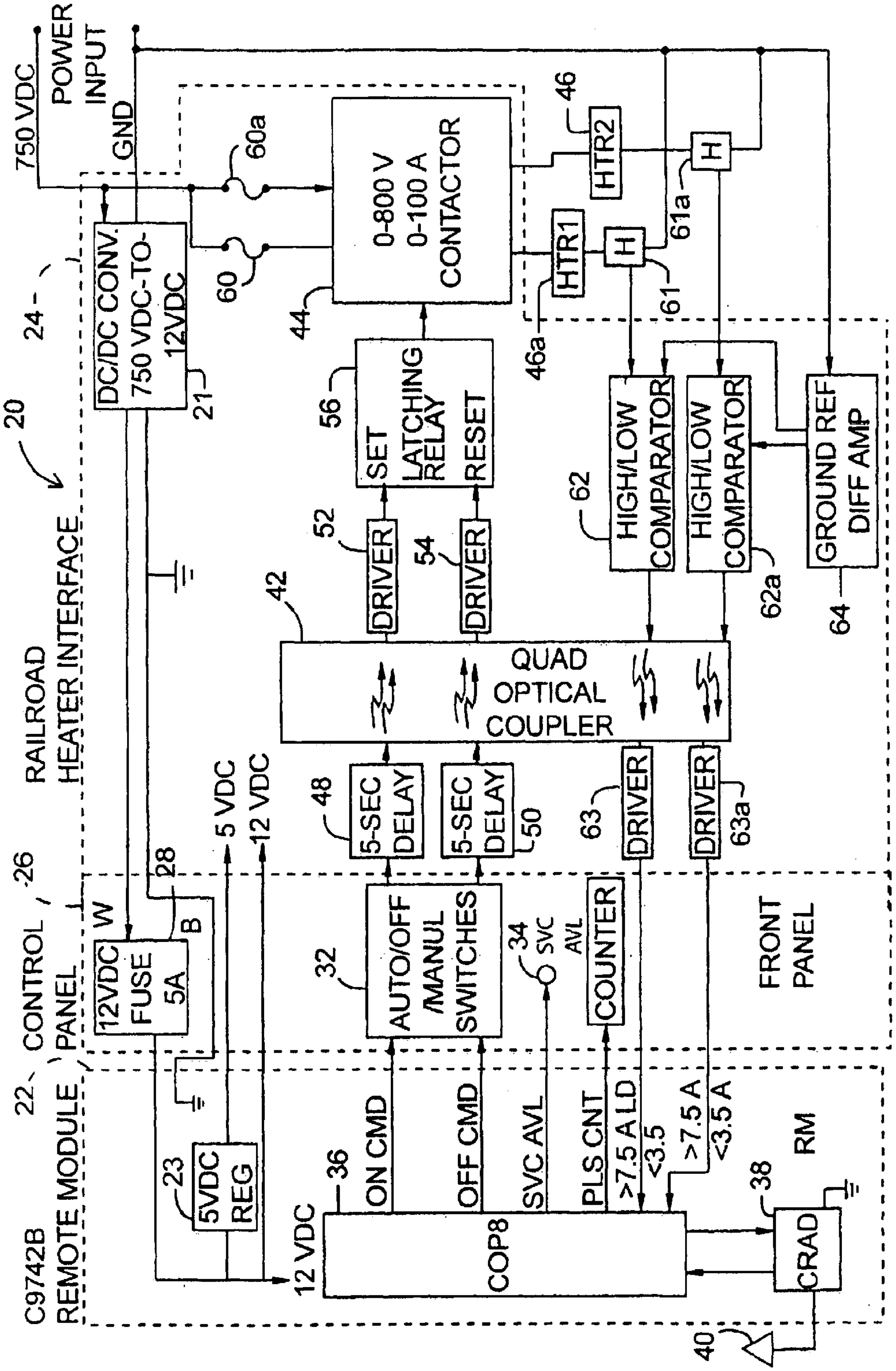
FIG. 3 is a block diagram of a remote module for activating and deactivating railroad switch heaters.

Referring now to FIG. 3, a block diagram of unit 20 is shown. Here, those portions shown in dashed lines are a remote module 22 and a railroad heater interface 24. Included in the interface 24 is a control panel 26 providing access to a 12 volt fuse 28 for providing fused power to remote module 22, a readable counter dial 30 and switches 32 that allow the unit 20 to be completely de-energized, or switched between manual or automatic operation. In addition, an indicator lamp 34, when illuminated, indicates that unit 20 is functional. Electrical power for unit 20, in the instance where the railroad cars are driven electrically, such as from a 750 volt DC source, is obtained from a DC/DC converter 21 and regulated five volt supply 23.

In portion 22, a microprocessor 36 such as the COP8 microprocessor as disclosed in my referenced provisional patent application, which is incorporated herein by reference, provides control logic for unit 20. A Cellemetry™ radio transceiver 38, which also may be as described in the incorporated provisional application, is coupled to microprocessor 36 so that communications may occur between a cellular tower and each unit 20 associated with a respective set of railroad switch heaters. An antenna 40 for radio 38 is disposed on an exterior of or extends from box 20 (FIG. 2).

Within interface portion 24, all communications between microprocessor 36 and circuitry of interface 24 occurs via optical couplers 42. This prevents any back EMF or other spurious signals from being transmitted between portions 22 and 24. As in the referenced provisional patent application, commands to the remote unit 22 are received by radio 38 and passed to microprocessor 36, which in turn provides these commands to a solid-state contactor 44 that energizes or de-energizes switch heaters 46, 46*a*. More specifically, the. ON and OFF commands are passed from microprocessor 36 to switches 32, which when in the AUTO position, pass the ON or OFF command to 5 second delay circuits 48 and 50, respectively. Switches 32 may also be set to a MANUAL position, which requires manual activation of the heaters, as by the conventional switch (not shown) for the heaters. Also, in switches 32 there is an OFF switch that de-energizes the associated heater and control circuitry of remote unit 20.

Delay circuits 48 and 50 prevent rapid cycling of the heaters by providing a delay, such as five seconds or so, after each switching operation. Such rapid cycling may generate undesirable back EMF impulses or have other deleterious effects on the circuitry. After passing through optical couplers 42, the ON and OFF commands may be applied to a respective driver 52, 54, which in turn provide outputs to the SET and RESET inputs, respectively, of a latching relay 56. Relay 56 in turn energizes a coil in contactor 44 to close a set of contacts in order to energize or de-energize heaters 46, 46*a* with 750 volt DC power. Contactor 44 is a high current, high-voltage device available from a number of vendors, such as EATON-CUTLER HAMMER™.

In another embodiment, the latching relay 56 may be omitted, with the "ON" and "off" commands being held at a respective potential by the microprocessor, i.e. +5 volts for an "ON" state and 0 volts for an "OFF" state, with these potentials being applied directly to the contactor 44 via a respective driver. In addition, a latching relay, where used, may provide status indications back to microprocessor 36. The ceramic switch heaters 46, 46*a*, are typically constructed of a ceramic material that when first energized draw about 100 amps of current flow. This flow tapers off over about five minutes or so to a nominal operational current flow of about five amps. Thus, fuses 60, 60*a* are sized at about 125 amp current at 800 volts DC. As stated, contactor 44 is a high-voltage, high current device constructed to handle these levels of voltage and current.

Comparators 62, 62*a* each function to provide an output when a respective voltage indicative of current flowing through a respective heater falls below or rises above a voltage indicative of current flow less than about 3.75 amps or greater than about 7.5 amps, indicating that the associated heater is drawing either too little or too much current, both of these conditions indicating failure or impending failure of the heater. Current is measured, as by current-measuring devices 61, 61*a*, that may be based on Hall effect devices. Here, a secondary current flow is induced by the heater current flow, with the secondary current flow being nulled. The amount of current necessary to null the secondary current is in turn sensed by a Hall effect device, and is proportional to the heater current flow, with a potential thereof being applied to inputs of high/low comparators 62, 62*a* respectively. The outputs of comparators 62, 62*a* are in turn coupled to respective inputs of optical coupler 42, which provides these outputs via drivers 63, 63*a* to inputs of microprocessor 36. Programming in processor 36, when it receives a signal indicative of abnormal current flow on either of these inputs, causes CELLEMETRY™ transceiver 38 to send an ESM containing an error or alarm message to the central processing facility. Such an error or alarm message contains at least a railroad switch identification for physically locating the railroad switch in order to perform maintenance of the heater, and possibly some indication as to the nature of the fault, i.e. overcurrent, undercurrent or an open condition, as where one of fuses 60, 60*a* becomes opened due to an associated heater drawing current in excess of 125 amps. When initially energized, and as stated, the heaters initially draw about 125 amps when first energized. Thus, comparators 62, 62*a* will indicate excessive current flow until the current flow falls to acceptable levels, which as stated occurs after about five minutes or so. As such, microprocessor 36 may be programmed so that a delay of about five minutes or so is introduced before sampling of the comparator outputs begin.

Control logic used in unit 20 may be as described or similar to that in the referenced provisional patent application, i.e. a COP 8 microprocessor 41 which provides as outputs an ON command and an OFF command, these commands energizing and de-energizing heaters 46 and 46*a*. An SVC AVL port provides an output to a lamp 34 that is illuminated when unit 20 is in service and logged onto a cellular system. A counter 30, preferably having a mechanical dial (or other nonvolatile storage where an electronic dial is used) so that a power outage does not result in the counter losing its count, and receives as an input an incrementing count signal each time microprocessor 41 provides a switching signal, either ON or OFF, to the switch heaters. Thus, counter 30 maintains a record as to the number of heater activation/deactivation actions that have occurred since a predetermined time. Such a count may be used as a parity check by comparing the record on counter 30 with a similar record in the database of a central processing facility.

At the control center or central processing facility 43 (FIG. 4) of the service company, software incorporated in servers and general purpose-type computers is used to control the heater switching system and interface the system to the Internet 45 and cellular network system. In broad terms, a graphical user interface 72, which may be a windows-type or other interface, allows operators of the service company and end user company operators to interact with the system. As such, there may be a plurality of interfaces 72 at different locations feeding information to a web server 70 at a central location. Web server 70 interfaces the system to Internet 45, and allows initiation of management operations and provides notifications to users, such as warnings that a particular one or ones of the heater circuits are or about to become inoperable. As described, all that a client company needs to receive such warnings and other messages is a computer coupled to the Internet, and a conventional browser. Alternately, the entire system may be leased or licensed to a user organization, such as TVA (TENNESSEE VALLEY AUTHORITY) or other such large organization, such as a utilities company (water, gas, electricity) where monitoring and/or control of equipment is needed over a large area or there are many customers to be monitored.

In the service company computer, a remote module server 74 assembles MIN numbers mobile system I.D. and switch number into pages and forwards the pages to gateway server 76, and receives registrations (ESN numbers) from the remote modules by way of gateway server 76. In addition, remote module server 74 contains routines that provide automatic system diagnosis and the aforementioned alarm functions. Server 76 also provides an interface between my service company and the cellular services. Pages are temporarily buffered in a message queue 77, and passed to remote module server 74 and gateway server 76, which passes the page to the IS-41 (control channel) system. The IS-41 system communicates with a local cellular switching center 82 and tower 84, which sends pages to discrete heater remote modules 26 and receives registrations from heater remote modules 20.

Figure 4:
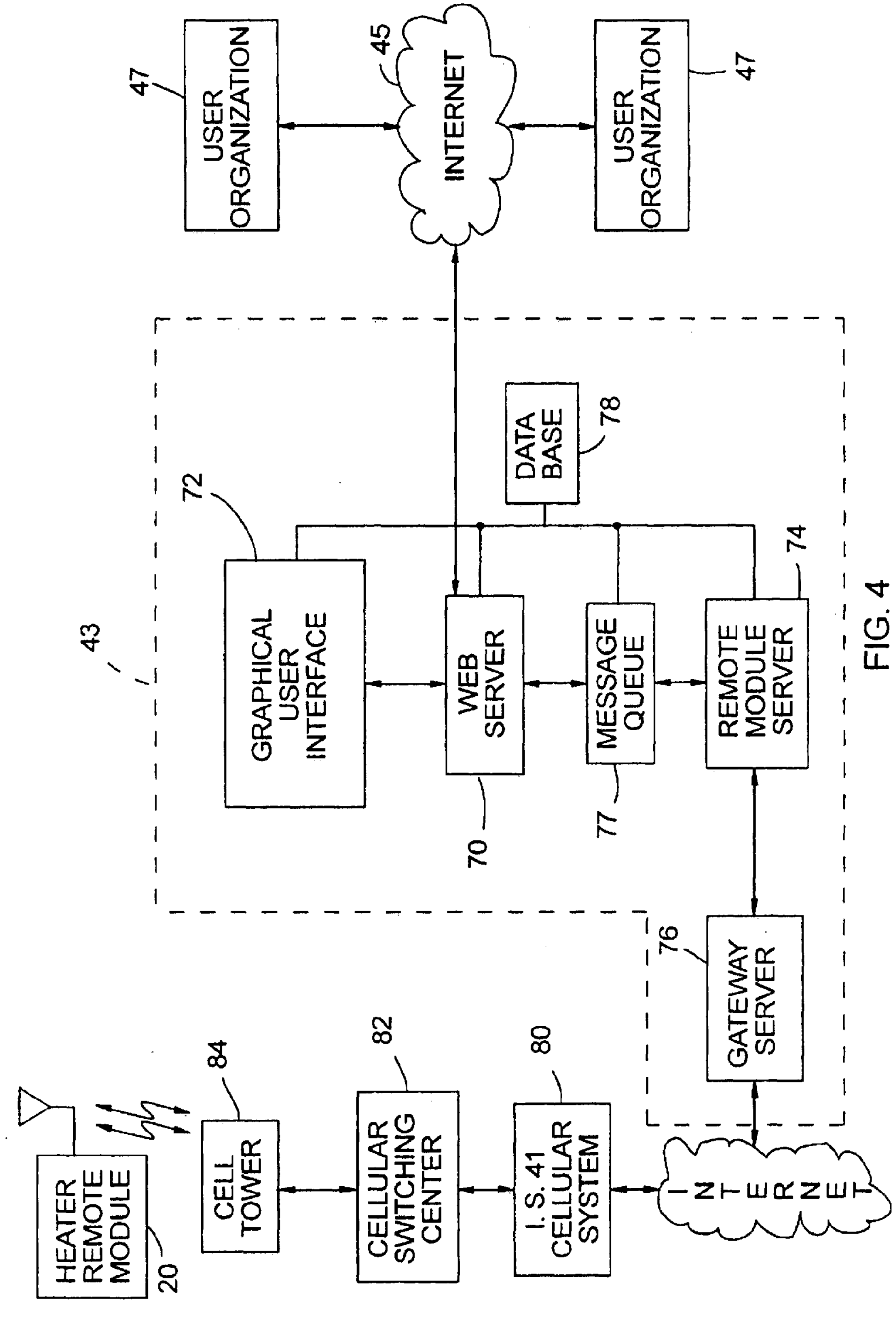
FIG. 4 is a block diagram generally showing layout of my invention.
Figure 5:
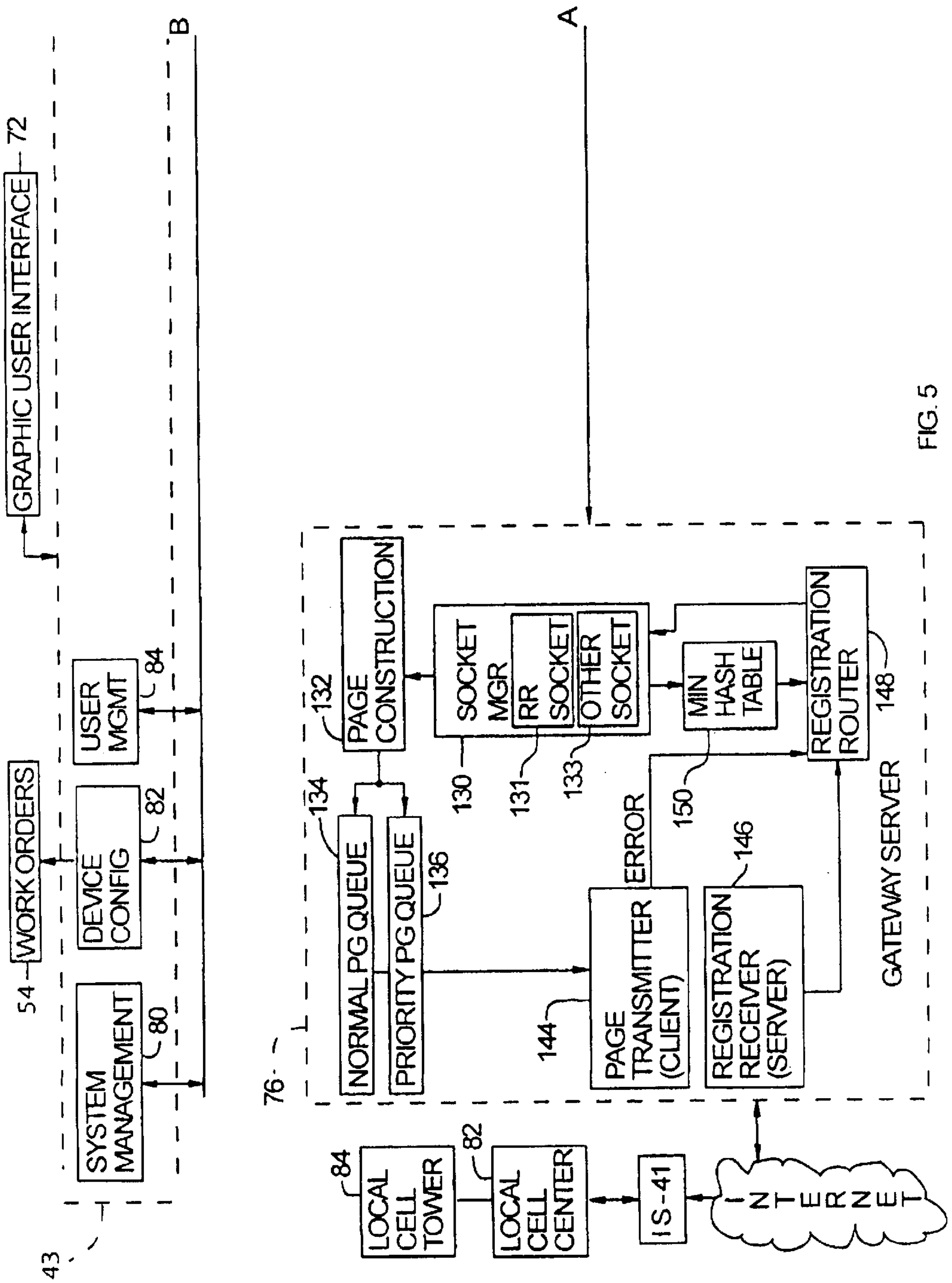
FIG. 5 is a block diagram showing architecture of my invention.
Figure 5A:
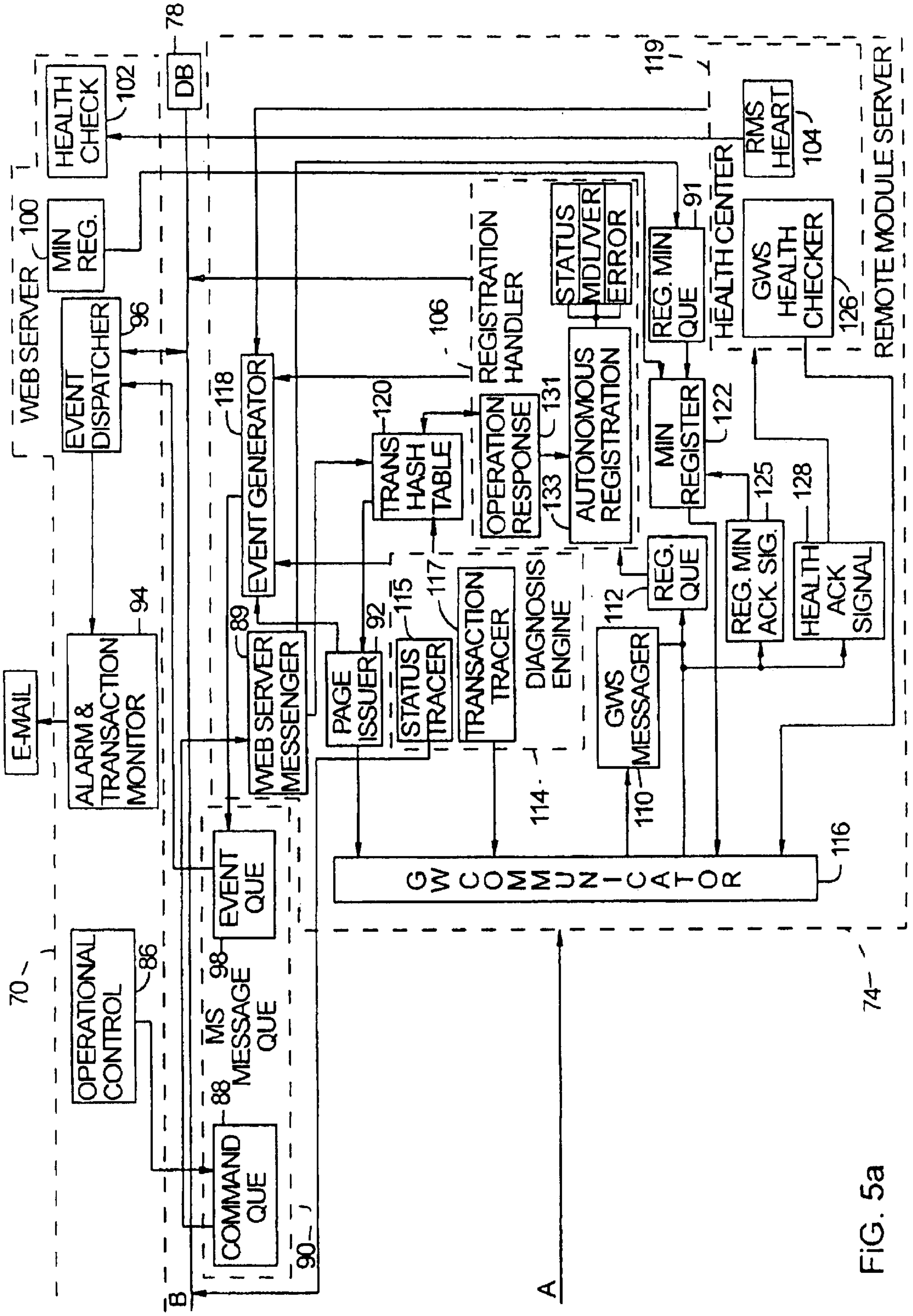

More specifically, and referring to the block diagram of FIG. 5, the control center 43 of FIG. 4 is shown. Here, graphical user interface 72 may include any operating system, such as Windows 2000™ or Windows NT™. Other operating systems, such as LINUX™ and UNIX™ may also be used as would be determined by a skilled programmer. Any browser, such as Internet Explorer™, Netscape™, Eudora™, Mozilla™ or another as determined to be appropriate by a skilled programmer may be used. As stated, interface 72 may be in a client company computer, in addition to an interface 72 in the service company system. A web server or general-purpose computers 70 generally configured as shown and described may be in a client company location. Further, web server 70 and remote modules server 74 may be configured as software modules that may be installed on a client company's computer system. Further yet, a plurality of remote module server software modules and web server modules may be installed in one or more computer servers of my service company.

For web server 70, VISUAL STUDIO™ ASP NET™ may be used as a programming language. VISUAL C#™ may be used to develop remote module server 74. VISUAL C$^{++}$™ may be used to develop the gateway server, and MICROSOFT™ SQL SERVER 2000 may be used for the database. For database access, ADOYET may be used, and HYPERTEXT MARKUP LANGUAGE™ (HTML) may be used for generating reports. Of course, other programming languages may be used, as would be determined by the particular computers and server system of other applications.

Graphical user interface 72 communicates with web server 70, which also contains service routines or modules for system management 80. System management 80 generally performs management functions, such as system parameter configuration, i.e. TCP/IP port setting, maintenance of lookup tables, system timer control, monitors system performance and manages logs and alarms.

Device configuration 82 provides for adding, reconfiguring and deleting railroad switch yard information and, within each switch yard, allows for adding, reconfiguring and deleting discrete heaters and corresponding remote module information associated with a particular railroad switch. Here, this function is typically performed at an administrative level. User management module 84 allows management of users by administrators and provides administrative privilege control so that operators may be added and deleted and passwords for operators and administrators selected or assigned.

Operational control and monitor module 86 relates to routine functions of the system, such as sending commands that energize or de-energize one or more railroad switch heaters. Also, this module handles alarms that are presented to operators, and handles other requests from operators of the heater switching system. For issuing commands, module 86 communicates with command queue 88 of the message queue 90. The command queue 88 in turn provides queued command information to web messenger 89. Messenger 89 aggregates MIN numbers so that the transmission portion of up to 8 transactions (MIN default numbers for particular remote units or a single global MIN number) may be sent in a single page, with a command MIN (heater ON, heater OFF, etc.) being the ninth MIN number. Here, a transaction is defined as the process of causing a remote unit to perform an action, and receive and process a response from that remote device indicating that the action was accomplished. As such, each transaction is assigned an ID number that includes identification of the remote unit associated with that transaction, given a time stamp and includes a status flag that is used to indicate the transaction's status to various components of the system.

As it generally takes a minute or so for a page to be sent, pages containing the same MIN number, as where a command or request is incorporated into two pages and the pages must be received by the remote unit sequentially, must be spaced apart in time to avoid the possibility of the second page being transmitted prior to the first page. Also, one or more bit positions in the MIN number may be used to indicate to the cellular system where in a sequence a page is to be inserted. Further, the commands may be prioritized in remote module server 79, as where a command or request for data relating to a surveillance system or a request for data relating to an electrical power outage is tagged as a higher-priority message. Such a priority code may range from low, medium and high, thus requiring only two bits to transmit priority information. In other instances; priority may be either low or high, requiring only one bit to transmit priority information. As such, lower priority commands, such as a request to read a meter or obtain daily usage, may be sent when there are no existing higher priority commands to be sent. The transactions are stored in a transaction hash table 120, after which the commands are obtained by page issuer 92. Hash table 120 incorporates several algorithms such as sorting pages in accordance with a priority scheme, for searching for one or more transactions that generate an error in the system and passing the error to registry handler 106, associating a received registration to a respective sent command and determining an origin, i.e. a source, of commands in the instance where multiple diverse systems are used. Page issuer 92 communicates the commands to the gateway server communicator 116, which in turn issues them, as by a conventional TCP/IP socket interface, to gateway server 76.

Alarm and transaction monitor 94 in web server 70 receives alarms, alerts and similar messages from remote modules and the system in general and provides them to operators of the system. These alarms may be generally indicative of failures of devices connected to a respective remote module, such as a railroad switch heater, a water, gas or electrical meter or surveillance device. In addition, responses to inquires, such as status requests, are provided to operators via alarm and transaction monitor 94. Further, software and hardware errors of the system are reported via alarm and transaction monitor 94. These alarms, inquiries and error messages are provided to monitor 94 by event dispatcher 96. Generally, event dispatcher 96 obtains event data from event queue 98, which temporarily stores transaction results and alarm messages, and associates transaction results messages with a respective MIN number and transaction ID obtained from data base 78. In addition, the event dispatcher correlates a result with a user in the event where multiple, diverse systems to are incorporated in a single service company system.

Event data received by event dispatcher 96 is generated by event generator 118, which receives inputs from health center 119, registration handler 106, diagnosis engine 114 and page issuer 92. With respect to health center 119, any failure with respect to overall operation of the system and errors that are returned will elicit an alarm by health center 119, which alarms and errors being passed to event generator 118. With respect to commands and requests, page issuer 119 provides a return indication to event generator 118 that the page containing one or more commands or requests was successfully sent. If the page was not successfully sent, an acknowledgement signal from the gateway server is not received and the command or request is not deleted from hash table 120. This results in two attempts to resend the page, after which an error is generated. A received acknowledgement response to sending a page to remote unit is passed to gateway communicator 116, and subsequently to gateway server messenger 110. Messenger 110 provides the acknowledgement signal in the form of a registration, and places the registration in registration queue 112. From there, registration handler 106 periodically polls registration queue 112, and picks up the registration and processes the registration as shown in FIG. 9*a–1* and 9*a–2* as will be described.

Registration handler 106, responsive to an incoming registration, provides an indication of such to event generator 118 that a registration has been received. Incoming registrations from gateway server 76 that are solicited, i.e. responsive to commands and inquiries, are received by gateway communicator 116 and passed to registration queue 112. From queue 112 the registrations are passed to registration handler 106. Here, operation response 131 associates a transaction in hash table 120 with the registration for the MIN of that transaction and changes status of the transaction to "completed". This results in the transaction being deleted from hash table 120, although the transaction may be stored in a log or history file in the database. Where the registration is unsolicited, i.e. from an alarm or status change, the registration is compared by autonomous registration module 133 with previous readings to determine what the change of status is, as in a surveillance system where a motion detector is tripped. This change of status is then provided to an operator. Where the registration contains an error message, then the information is sent to event generator 118 to be provided to an operator. In registration handler 106 are temporary storage areas for storing information related to remote units of the system. For example, status is an area where status information of remote units is stored, this information related to power, battery levels and relay and switch positions. MOD/VER is storage for the model numbers and versions of the remote units. ERROR is temporary storage for error messages, and which may generate a warning and store the error message in a log file.

Diagnosis engine 114, containing status tracer 115 and transaction tracer 117, traces transactions to insure they are acted upon and monitors health of the remote modules and network communications. Here, transaction tracer 117 periodically polls transaction hash table 120 for transactions that have been marked as completed by operation response 131, and deletes completed transactions from the hash table. Where a transaction has been acted on in server 74 but not acknowledgement of such was sent by either the cellular system or the gateway server, then transaction tracer 117 waits for a predetermined period of time, such as 2 minutes, and if a confirmation has still not been received, then it causes the transaction to be resent. This delay and resending occurs twice, and if no confirmation is received after the last resending, then transaction tracer 117 causes an alarm to be generated via event generator 118. Status tracer 115 monitors health of the remote units, each of which being typically programmed to transmit a health signal at predetermined intervals, i.e. once a day or so for remote modules such as in a meter reading application, or once a week or so during the summer for a snow melter application.

MIN register 100 provides temporary storage for adding and deleting MIN numbers for devices in the field that are added or removed. In this instance, when a new device is fielded, a new MIN number is assigned to that device. This new MIN number may be added by an administrator of the service company, or by an operator or administrator of the end user company. The new MIN number is added through device configuration 82, from which the MIN number is added to MIN register 100 and database 78. Register 100 is periodically polled by web server messenger 89, and obtains the MIN number and places it in register MIN queue 91. When a MIN number is found in queue 91 by MIN register 122, as by polling, the new MIN number is picked up and passed to gateway communicator 116. Communicator 116 in turn passes the new MIN number to gateway server 76 where it is stored in MIN hash table 150. MIN register 122 is also used during initialization of the system. Here, all MIN numbers for all remote devices associated with fielded systems, such as the railroad switch heater system, the meter reading systems and surveillance systems, are obtained from database 78 by register 122 and passed to the MIN hash table in gateway server 76.

While a direct pathway is shown (for clarity) for transferring MIN numbers from register 100 to register 122, the actual data pathway is through command queue 88, web messenger 89, and registration handler 106. Here, the new MIN number from device configuration 82 is inserted into command queue 88 by MIN register 100. Web messenger 89 then notifies MIN register 122 that a new MIN is being added. MIN register 122 then passes the new MIN number to gateway communicator 116, from which the Min number is passed to gateway server 76 and stored in MIN hash table 150. Such new MINs, when added to server 76, are acknowledged by register min ACK signal 125, which notifies MIN register 122 that the new MIN was successfully registered in hash table 150.

The remote module server health check signal from box 104 to health check module 102, while also shown as a direct connection from remote module system heart 104 for clarity, is in fact sent through event generator 118 and event queue 98 to health check module 102. This signal is provided from the remote module server 76 to module 104, and indicates health of the remote module server. Health check module 102 in web server 70 monitors general health of the remote modules. Gateway server health checker 126 monitors health of the gateway server, and receives health information via gateway server messenger 110 and health acknowledgement signal 128. In this system, upstream components check health of downstream components, i.e, web server 70 checks health of remote module server 74, server 74 checks health of gateway server 76, etc. If there is a problem with any of the components then an error message is sent to an administrator of via event generator 118.

As described, transaction information for sending a page is developed in operational control module 86, as when a command, such as to energize or de-energize one or more heaters, read particular water, gas or electrical meters, etc., may be initiated by a user logged into web server 70. In other instances, operational control module 86 may be programmed to automatically send pages to the remote devices, as where meters are being read. The transaction information for a page is passed to command queue 88 where it is held until called by web messenger 89 and passed to hash table 120, where it is stored until called by page issuer 92. Page issuer 92 issues a page to gateway communicator 116, which in turn passes the page information to gateway server 76. In addition, page issuer 92 provides notification to event generator 118 that a page was issued, and event generator 118 in turn provides notification to the operator as to whether the page was successful or not. Gateway server 76 receives commands and inquiries from remote module server 74, and passes these commands and requests through the Internet to the CELLEMETRY™ gateway. From the other direction, responses and registrations are transmitted by the IS-41 and cellular phone system to the CELLEMETRY™ gateway and through the Internet where they are passed to gateway server 76.

Server 76 receives page requests from server 74 via a socket manager 130, which may use a TCP/IP socket communicator. Socket manager 130 may be provided with discrete socket modules for handling different systems, such as railroad switch socket module 131, with other system socket modules, i.e. for meter reading, surveillance, etc., represented by “other socket” 133. It should be noted that these discrete sockets function similarly, so that such socket modules may easily be developed and added or deleted as needed to the platform. Where there are different remote module servers, which as described may be either in separate computers or configured as modules in one computer, the boxes marked STATUS, MOD/VER and ERROR are constructed to be specific to that system. Additional boxes may be added, for example in the meter reading application a box labeled METER READING would be symbolic of a processing logic and memory region where gas, electric and water meter readings would be stored.

The pages are configured into pages at page construction 132, and placed in one of queues 134, 136. These queues receive the pages as determined by the priority scheme in hash table 120. Here, pages stored in priority page queue 136 are sent first, and when empty, pages from normal page queue 134 are sent. Page transmitter 144 passes the pages to the CELLEMETRY™ gateway to the Internet, from which the page is routed by the IS-41 and cellular system to the remote module associated with the MIN number of the page. If an error occurs, page transmitter 144 provides the MIN number associated with the error to registration router 148, which in turn associates the error with the MIN number of the remote device from hash table 150. Hash table 150 maintains a record of all MIN numbers associated with the socket resources of all remote modules of the system. Registration receiver 146 receives registrations from the remote modules, and passes them to registration router 148, which associates the registration with a corresponding remote server by looking up the default MIN of the remote server in hash table 150. The registration is then passed to socket manager 130 for transmission to remote module server 74 to be processed as described.

Figure 6:
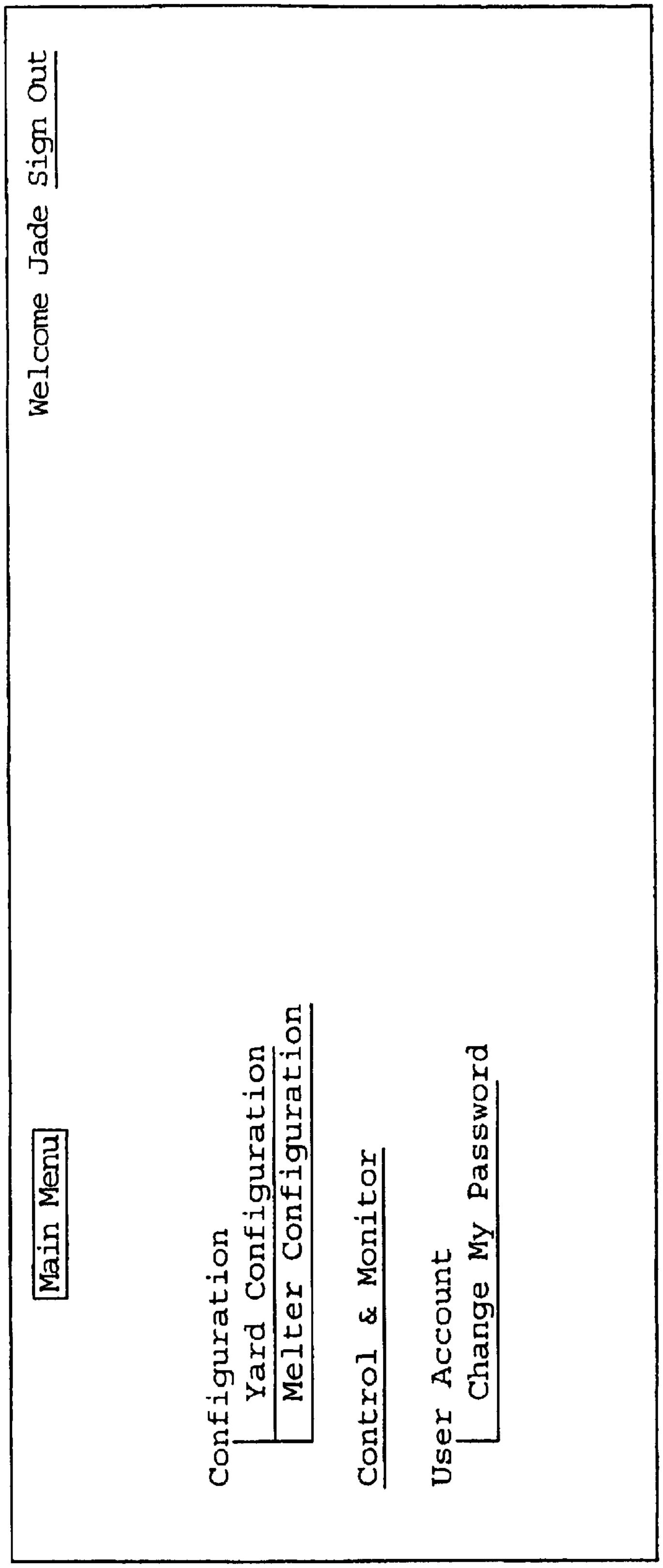
FIG. 6 is a screen shot, by way of example, of a main menu of a railroad switch heater system of the instant invention.
Figure 6A:
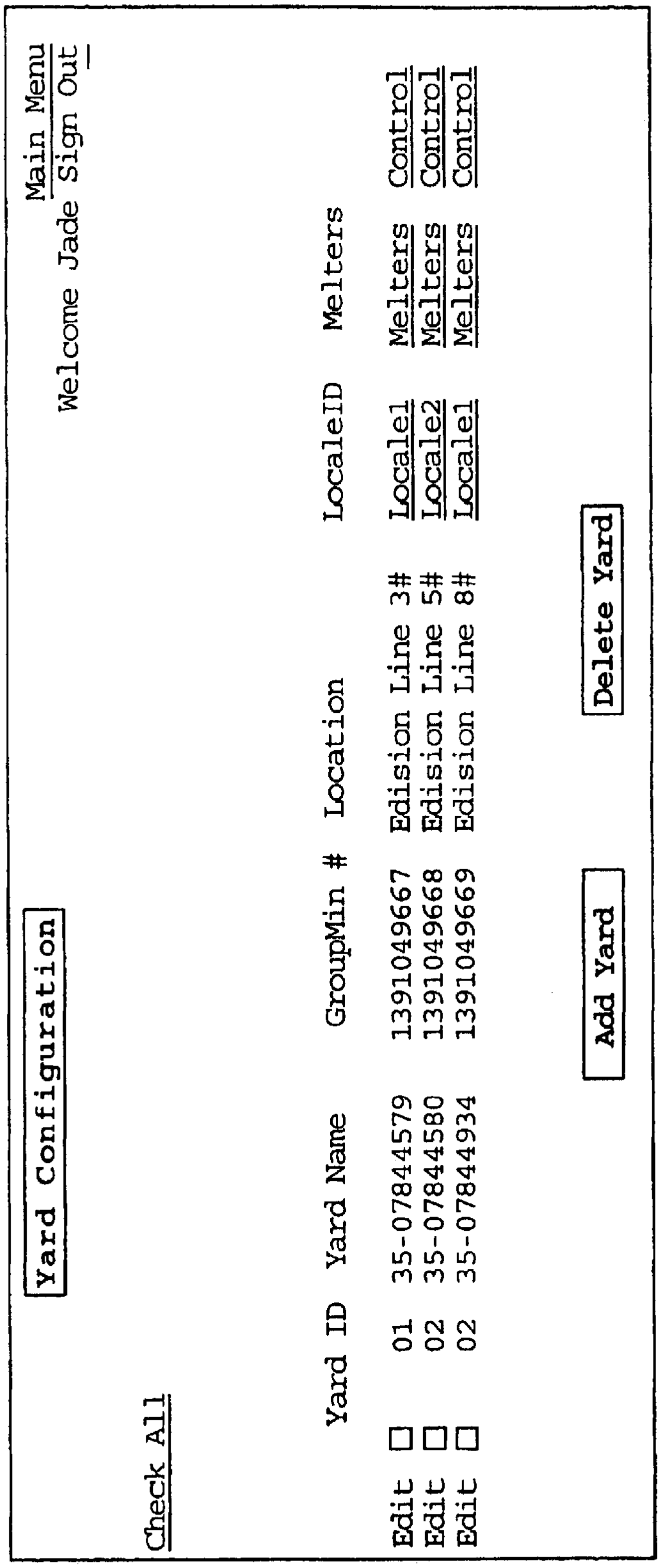
FIG. 6*a* is a screen shot, by way of example, of a railroad switch heater yard configuration page.
Figure 6B:
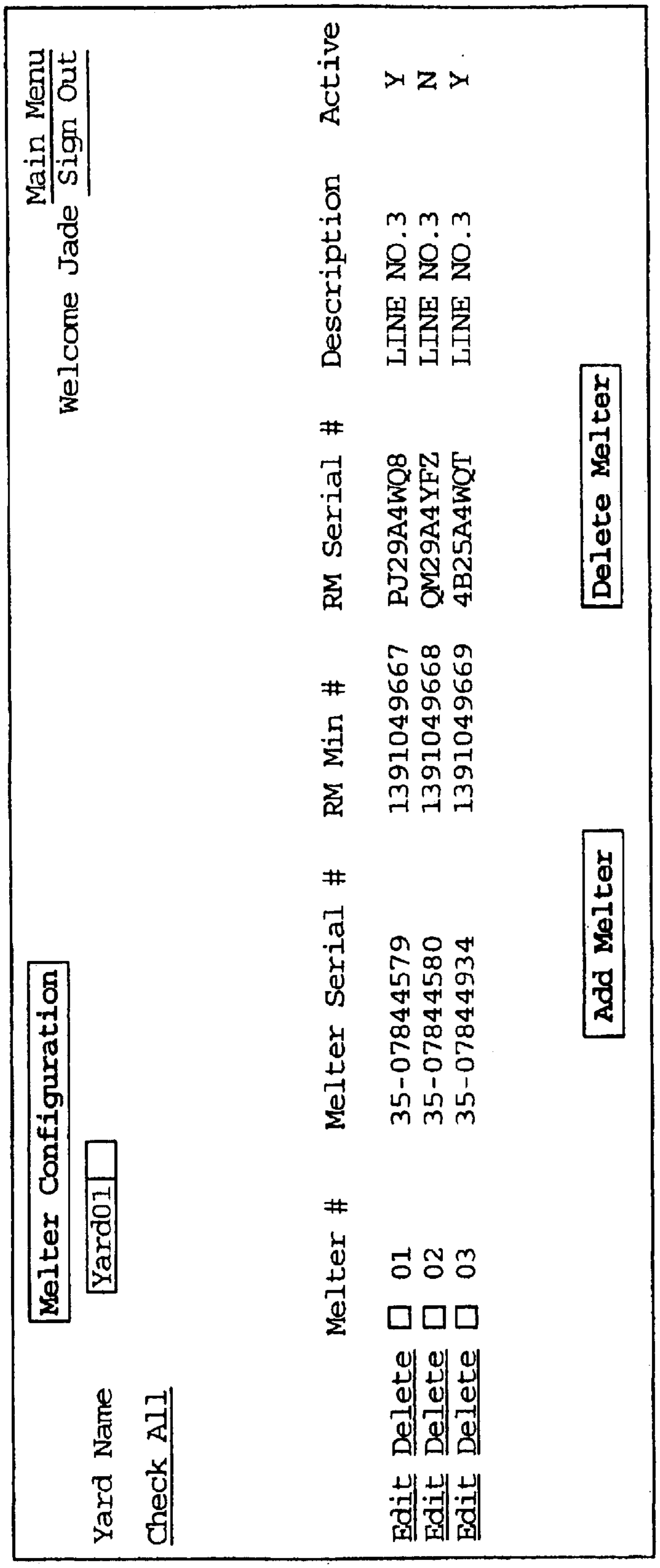
FIG. 6*b* is a screen shot, by way of example, of a menu for configuring discrete heaters of the system of instant invention.
Figure 6C:
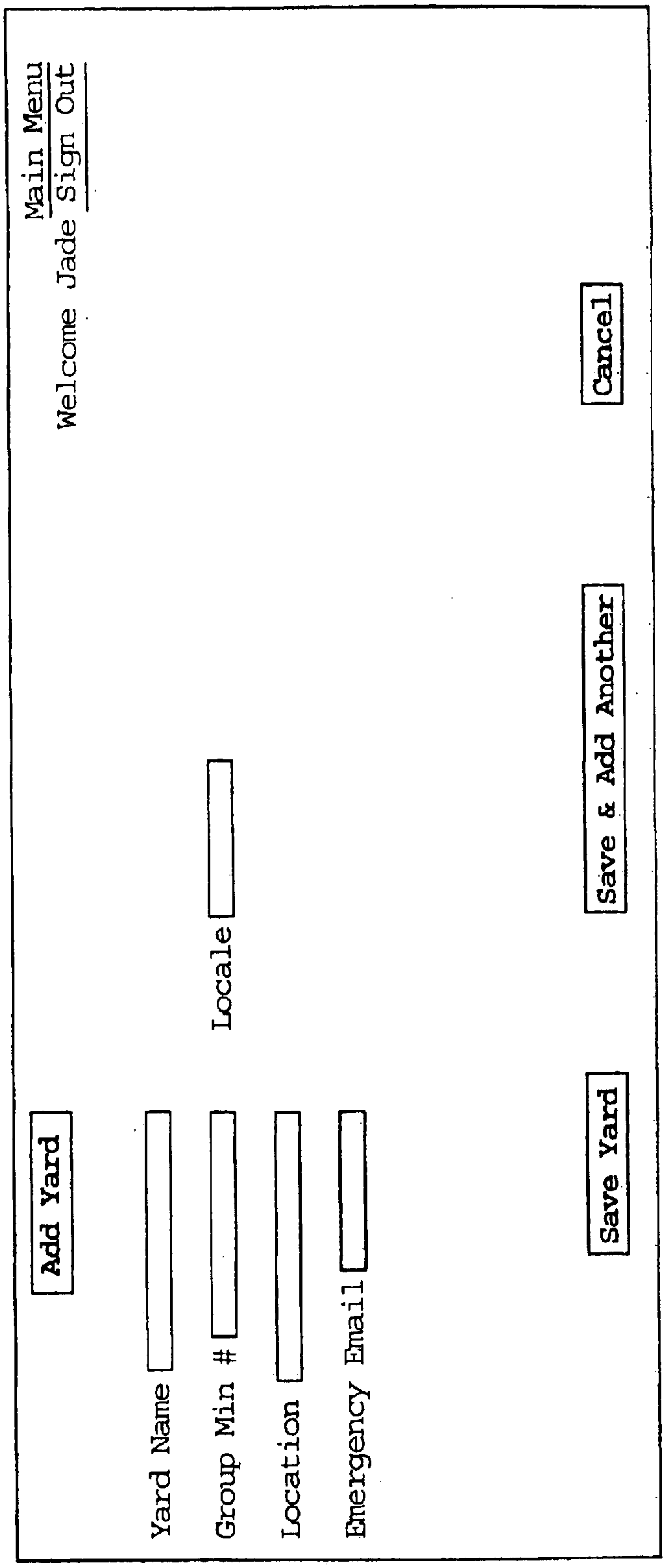
FIG. 6*c* is a screen shot, by way of example, of a menu for adding railroad switchyards to the system of the instant invention.
Figure 6D:
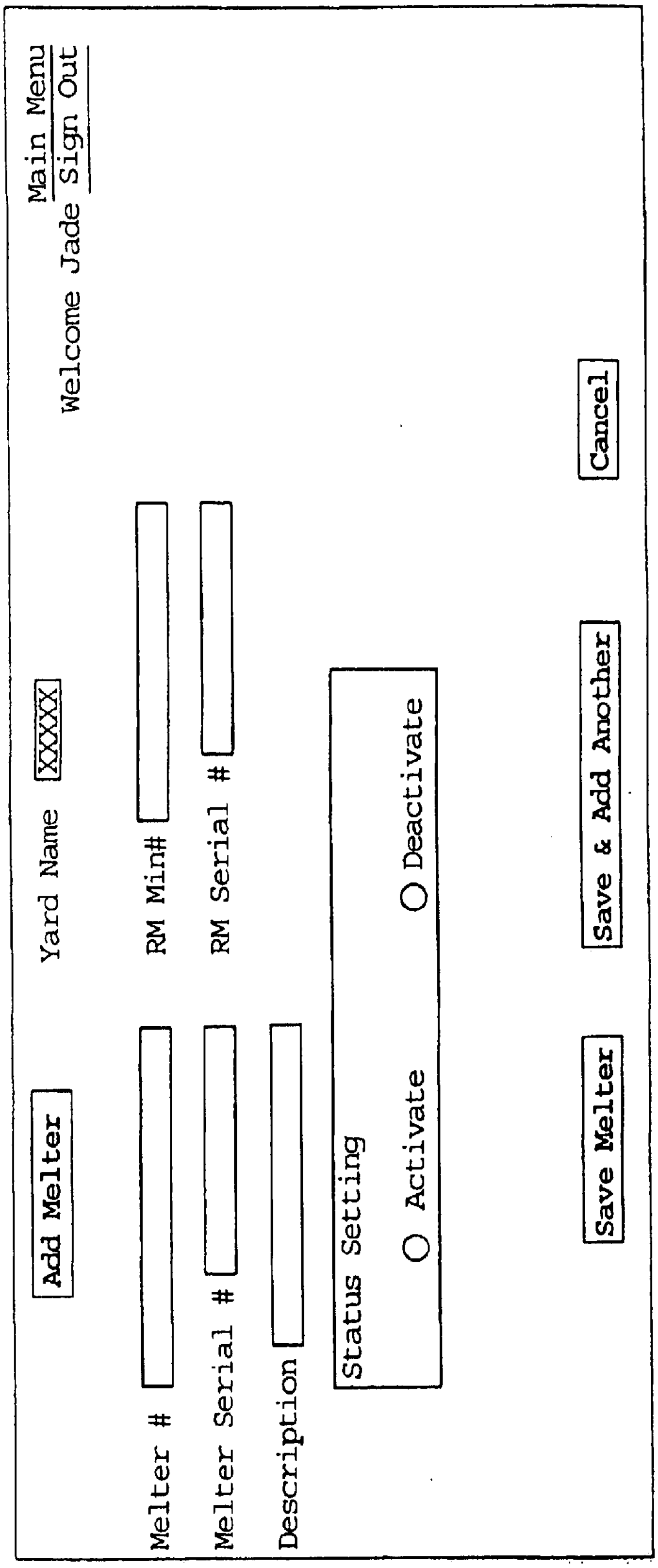
FIG. 6*d* is a screen shot, by way of example, of a menu for adding additional discrete heaters to the system of the instant invention.
Figure 6E:
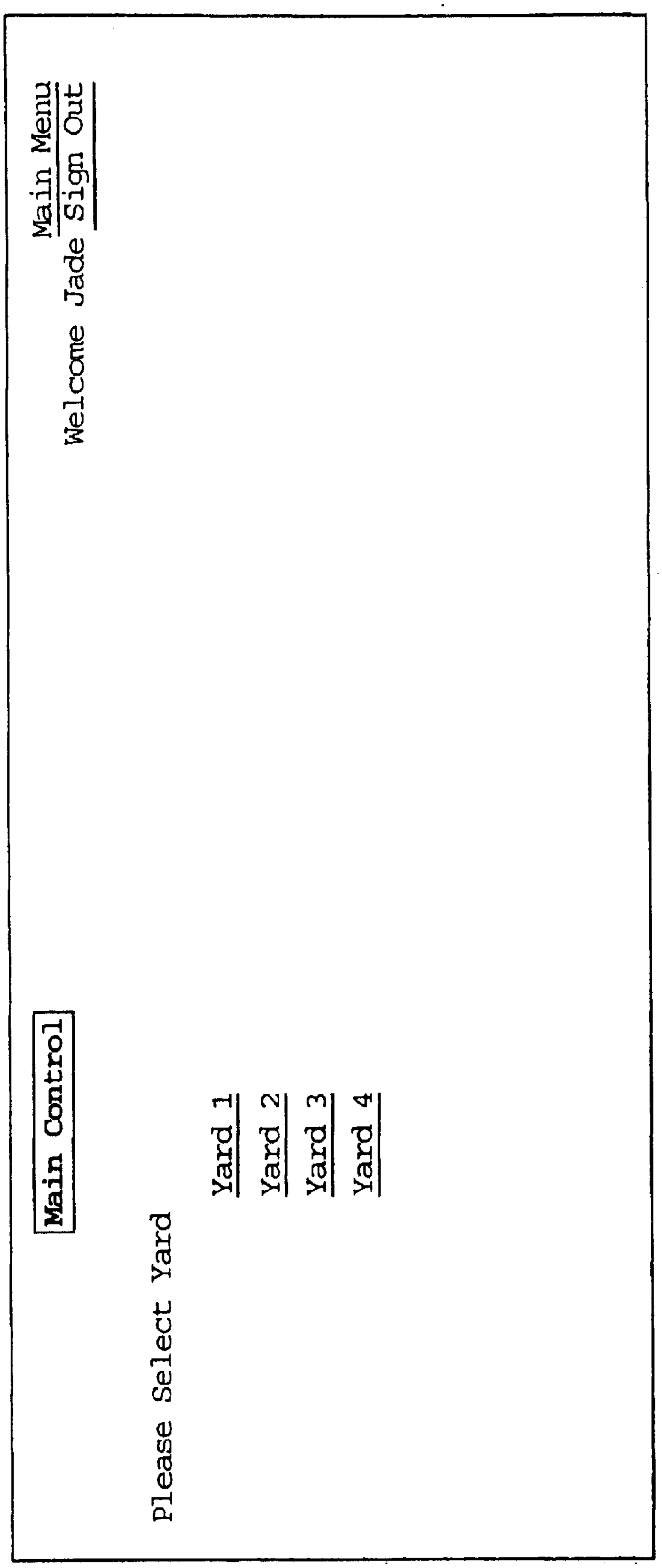
FIG. 6*e* is a screen shot, by way of example, of a menu for selecting railroad switchyards in the system of the instant invention.
Figure 7:
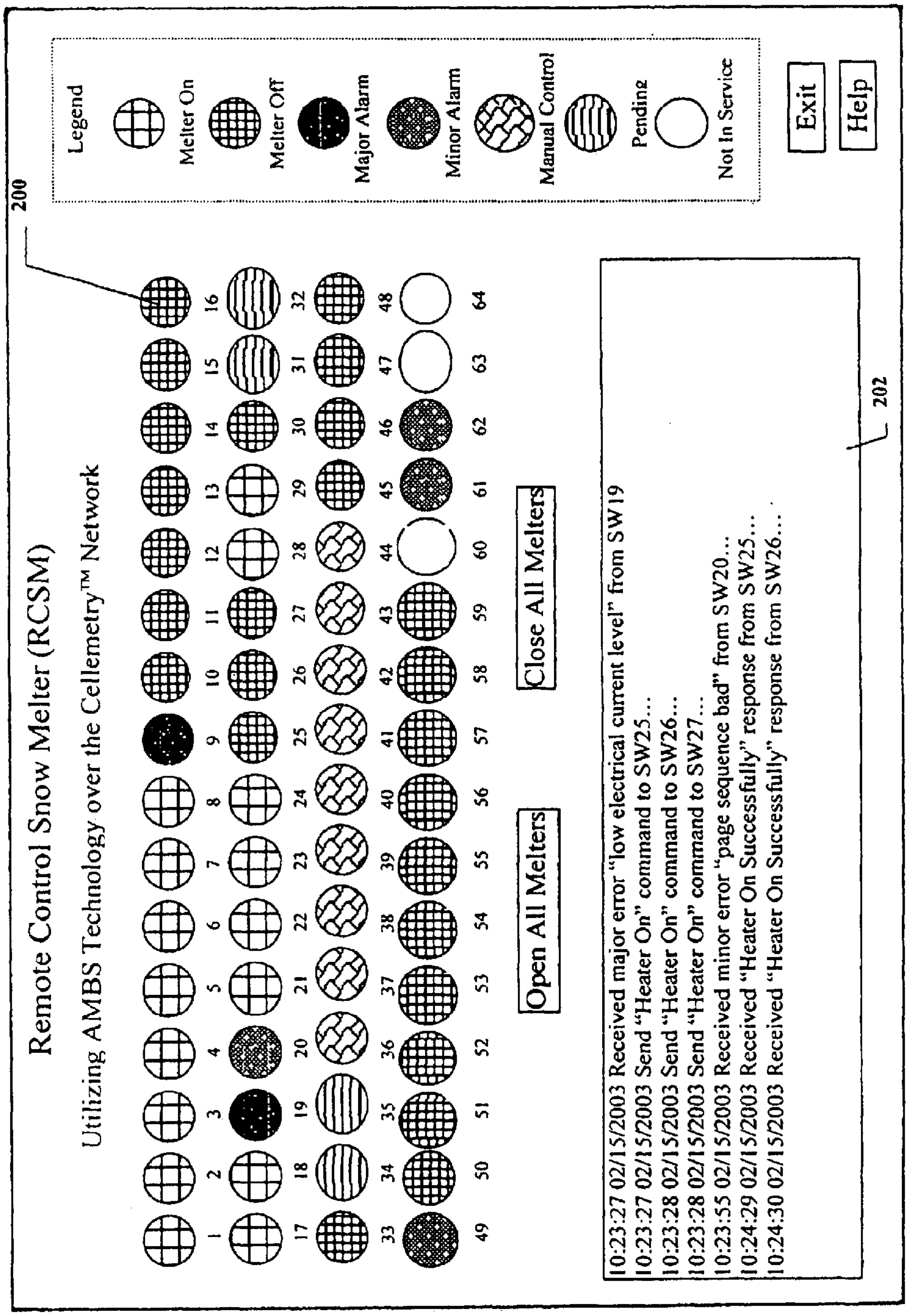
FIG. 7 is a screen shot, by way of example, of a control page for controlling railroad switch heaters in a railroad yard and for displaying status and alarm information.
Figure 7A:
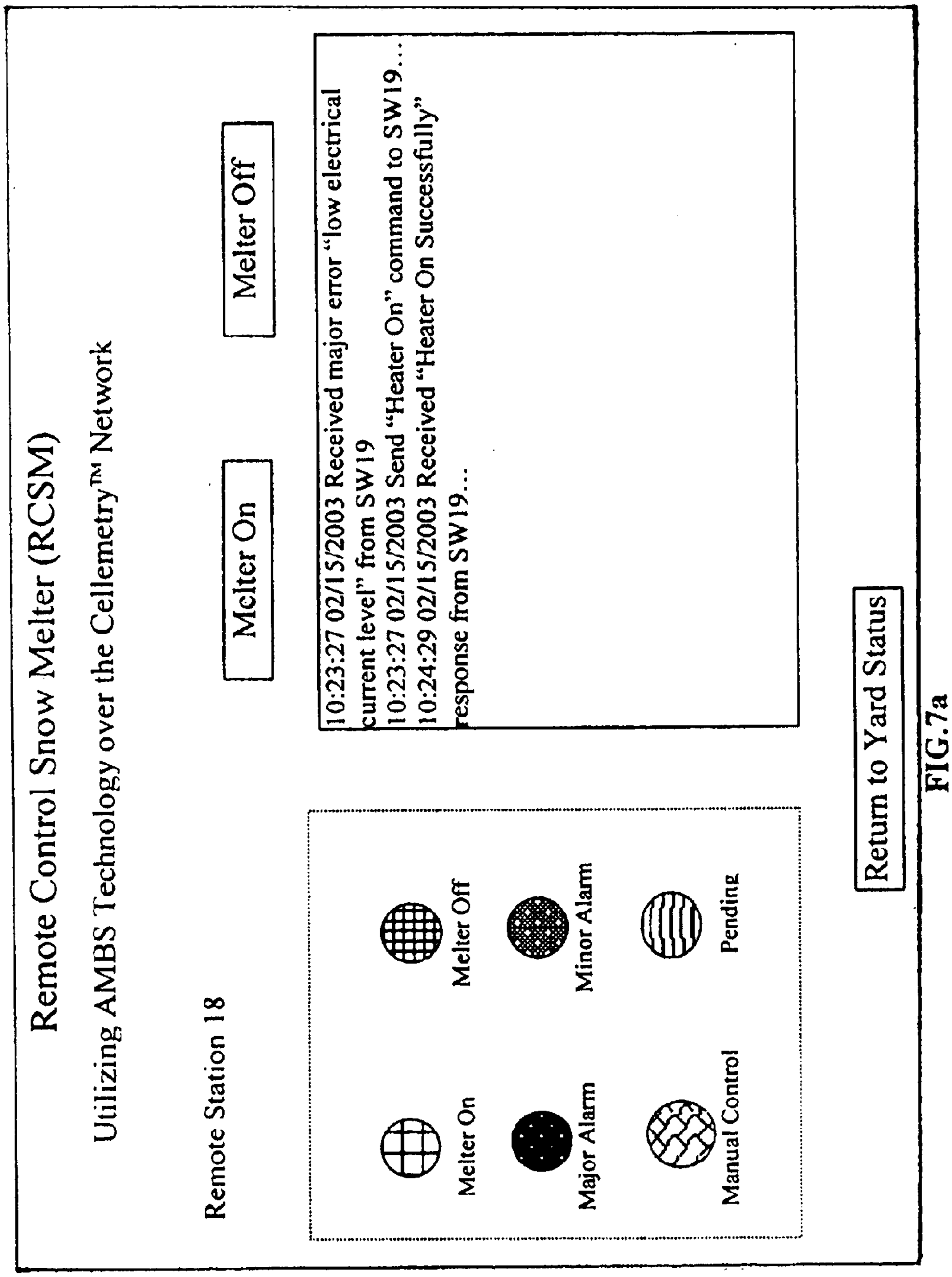
FIG. 7*a* is a screen shot, by way of example, of a control page for controlling discrete railroad switch heaters.
Figure 7B:
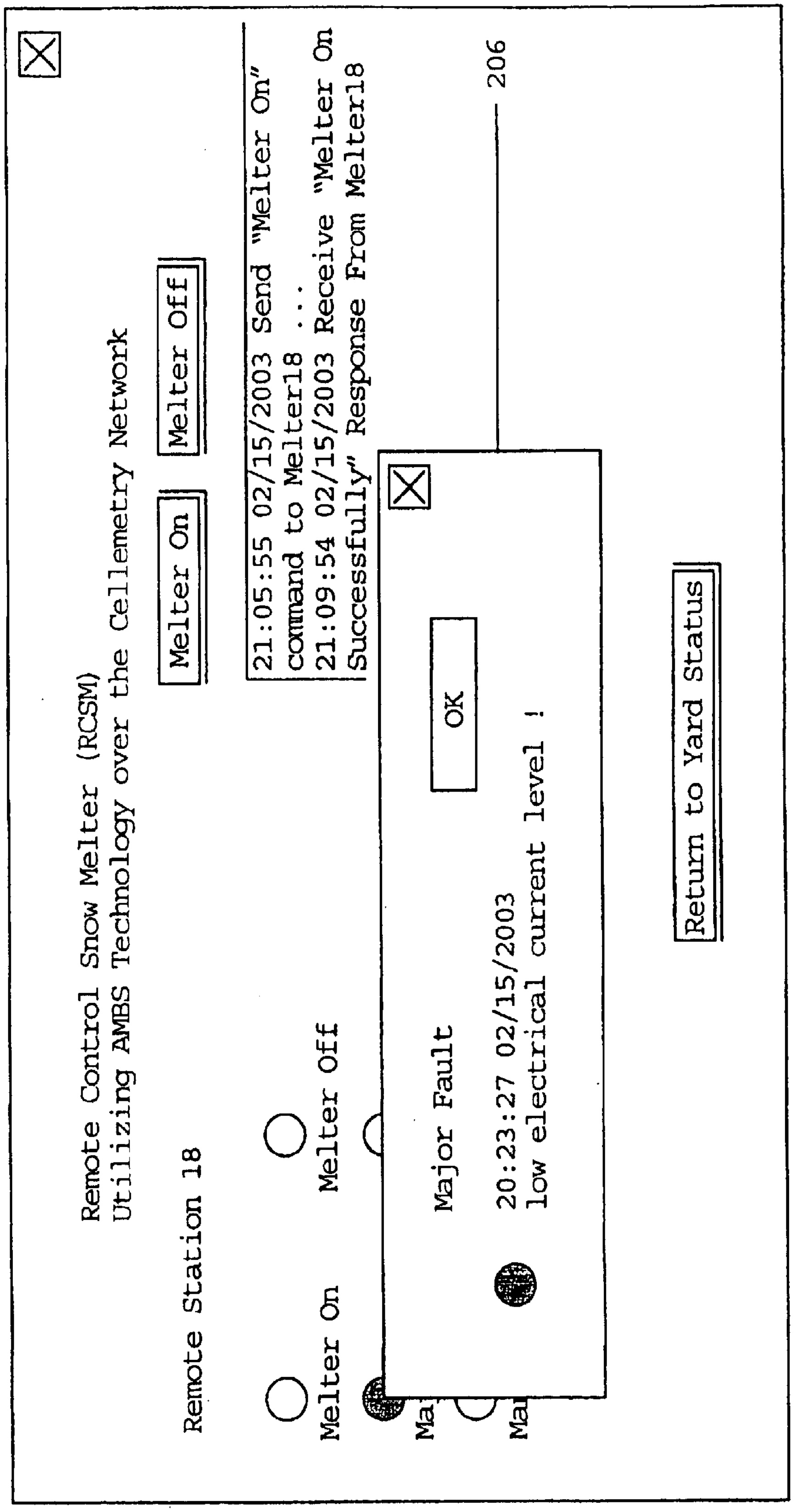
FIG. 7*b* is a screen shot, by way of example, of a control page showing a pop-up indication of an alarm.

Within the graphical user interface 72, a login screen is presented to an operator when logging onto the system. Within this login screen, a password and user name may be required, as should be apparent to one skilled in the art. After logging in, a main menu screen (FIG. 6) may be presented that contains menu options, or such options may be obtained from a pop up menu, a pull down menu or any other type menu as determined to be suitable by the programmer. Typically, such a main menu includes configuration options and allows for access of a particular railroad switching yard where the system controls more than one railroad yard, and also provides for control of discrete switch heaters. Examples of such yard configuration screens and heater configuration screens are shown in FIGS. 6*a* and 6*b*. Similar screens (FIG. 6*c*, FIG. 6*d*) may be provided for adding, reconfiguring or deleting railroad switching yards and discrete railroad switch heaters. For providing control of a particular switching yard, a screen such as that shown in FIG. 6*e* may be provided. After a switching yard is selected, an operator may be presented with a yard control screen such as that shown in FIG. 7, which screen showing status and alarm indicators 200 (sequentially numbered 1–60). A shown, these status and alarm indicators may each provide an indication as to whether a particular heater is "ON" or "OFF", and status indications of each heater system with respect to a major fault, minor fault, whether the heater is under manual or automatic control, as by switches 32 (FIG. 3) being either in the manual or automatic position, a "PENDING" indication, as when a heater is being installed, and a "NOT IN SERVICE" indication, which again may be controlled by switches 32. These various status and alarm indications may be indicated by a respective color or other feature to clearly indicate status. A window 202 may provide run-time status and details with respect to the status of a selected number of heaters. Window 202 may be expanded as needed to accommodate status of as many heaters as needed. Buttons marked "ALL MELTERS ON" and "ALL MELTERS OFF" provide an option to energize or deenergize all switch heaters in a particular railroad switching yard. Additional windows may be opened as shown in FIG. 7*a*, as by clicking on the button for that heater or highlighting and clicking on the status information of a heater in window 202. Here, each heater may be individually controlled and indications provided as to its run-time and status. When a major fault occurs, a pop-up window 206 may open indicating time of occurrence of the fault and nature of the fault.

Figure 7C:
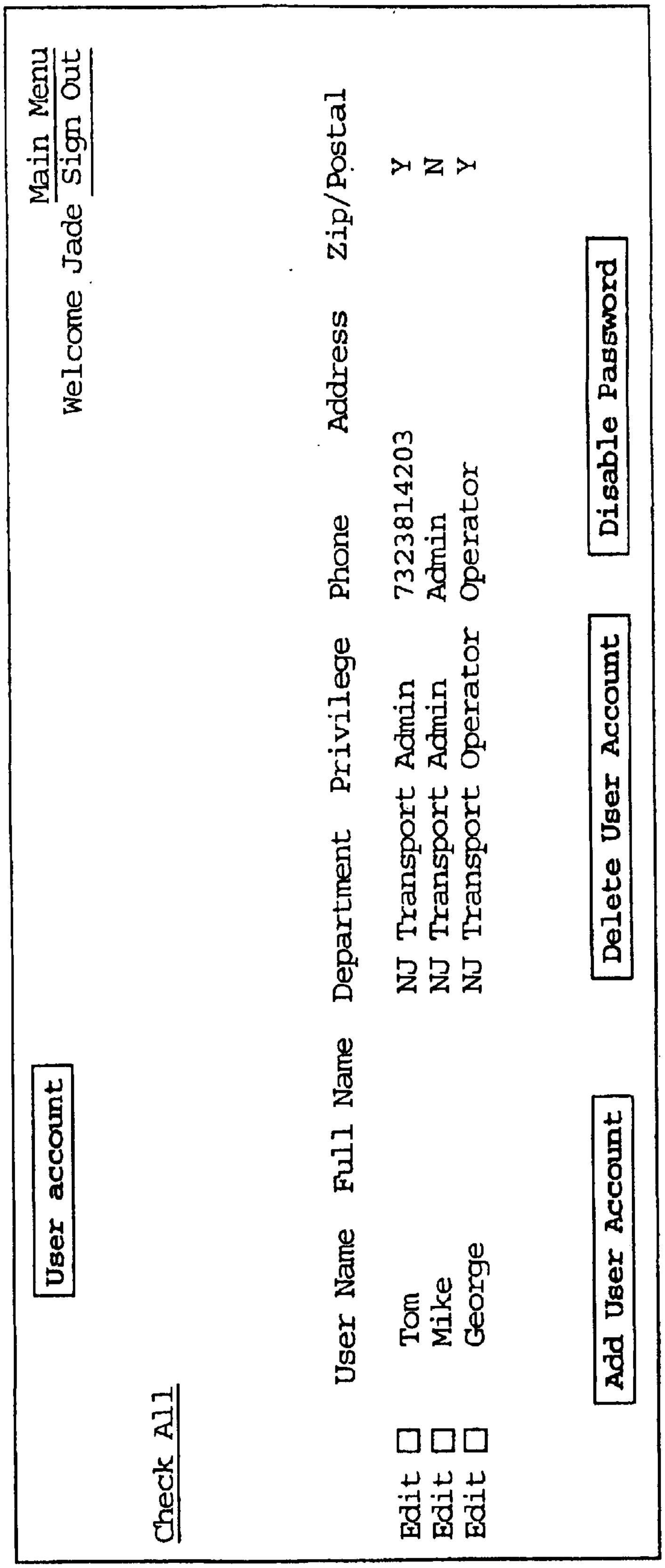
FIG. 7*c* is a screen shot, by way of example, of a configuration menu for managing accounts (end user companies) of the instant invention.
Figure 7D:
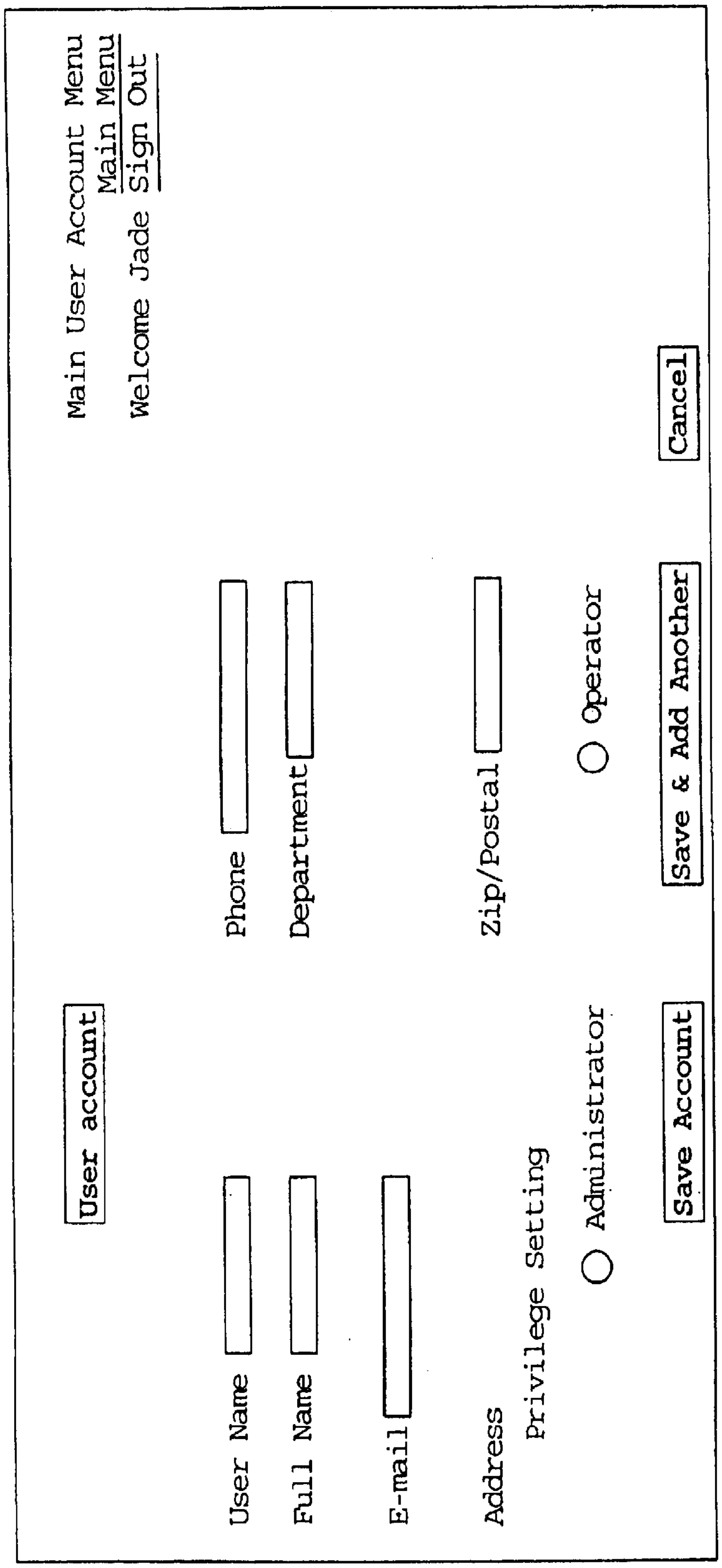
FIG. 7*d* is a screen shot, by way of example, of a configuration page for adding accounts (end user companies) of the instant invention.

An account configuration page is shown in FIG. 7*c*. This page is used by the service company to access a user account, such as a utility company, surveillance company, or a subway operator to control railroad switch melters as described. Within this page, users may be added or deleted, and administrators and operators for the user company may be added and deleted. Privilege levels for such users may also be assigned, as by highlighting and clicking on their names. This action may open another screen such as that shown in FIG. 7*d*, where more information about the user may be entered.

Figure 8:
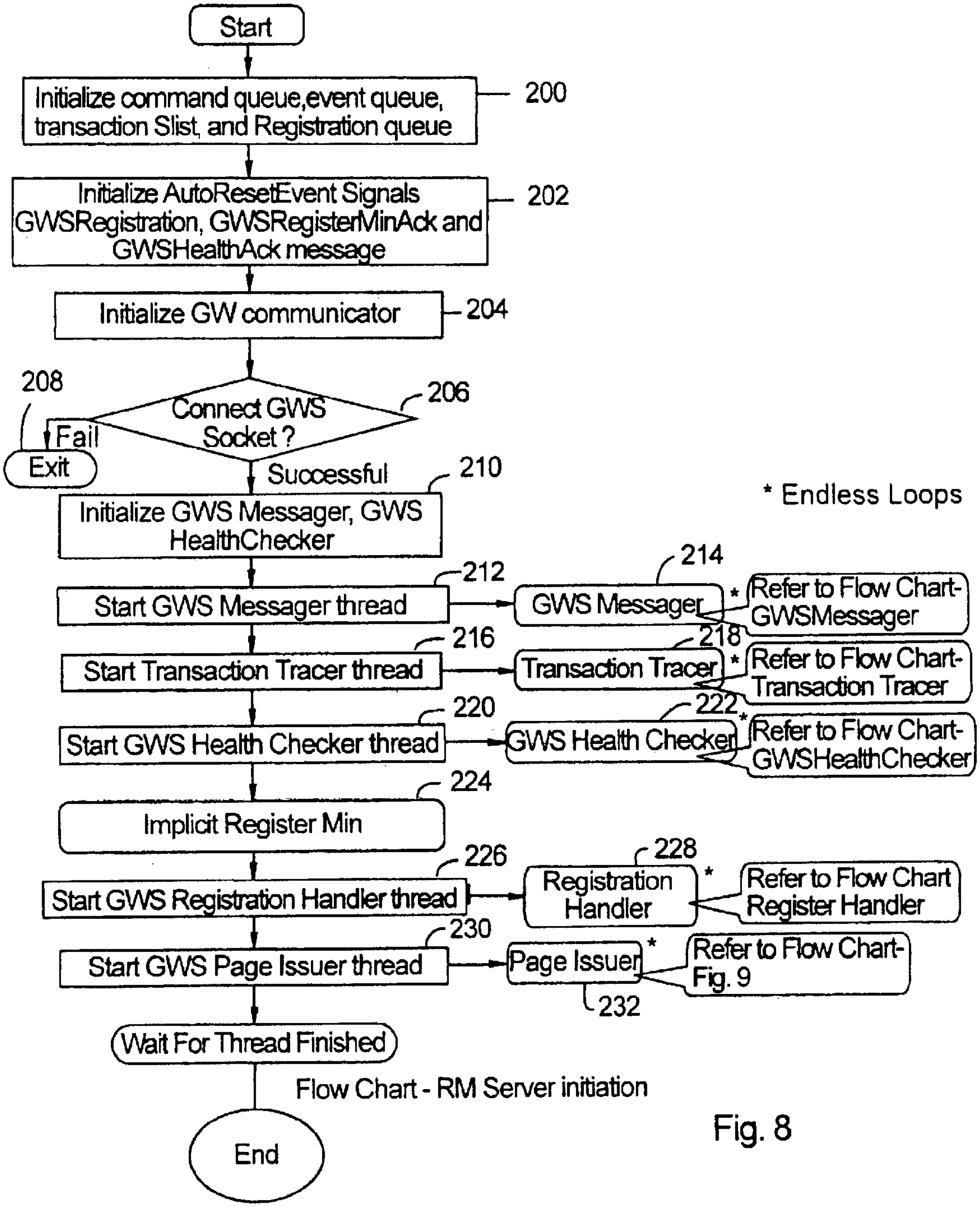
FIG. 8 is a software flow diagram, by way of example, of an initialization process of software of the instant invention.

A series of flowcharts will now be described, with functions of these flowcharts being generally related to remote server 74 in the block diagram of FIG. 5 and the screen images of FIG. 7–7*e*. Here, FIG. 8 shows an initialization sequence. First, at box 200, the command queue, event queue, and transaction hash table 120 (FIG. 5), labeled Slist, and registration queue are initialized, and where appropriate populated with default values. Next, at box 202 the autoresetevent signal, GWSregistration, GWSregisterMINack signal and GWShealthack message are initialized. At box 204 the GW communicator is initialized to establish the socket connection to the gateway server. At box 206 an inquiry is made as to whether the socket connection to the gateway server was successful, and if unsuccessful, then the program returns a FAIL signal and exits at box 208. If the connection was successful, then at box 210 the gateway server messenger and gateway server health checker are initialized. At box 212 the gateway server messenger thread is started, allowing the gateway server messenger to run at box 214. At box 216 the transaction tracer thread is started, allowing the transaction tracer to run at box 218. At box 220 the gateway server health checker thread is started, allowing the gateway server health checker to run at box 222. At box 224 the implicit register MIN, i.e MIN register 122 (FIG. 5) retrieves all MIN numbers for the remote modules from database 78 and passes them via the gateway communicator 116 to hash table 150 in gateway server 76. At box 226 the gateway server registration handler thread is started, allowing the registration handler to run at box 228. At box 230 the gateway server page issuer thread is started, allowing the page issuer to run at box 232. It should be noted that the threads of boxes 214, 218, 222, 228 and 232 run as endless loops, i.e when they reach the end, as shown on their respective flowcharts, they loop back to the beginning and run again.

Figure 9:
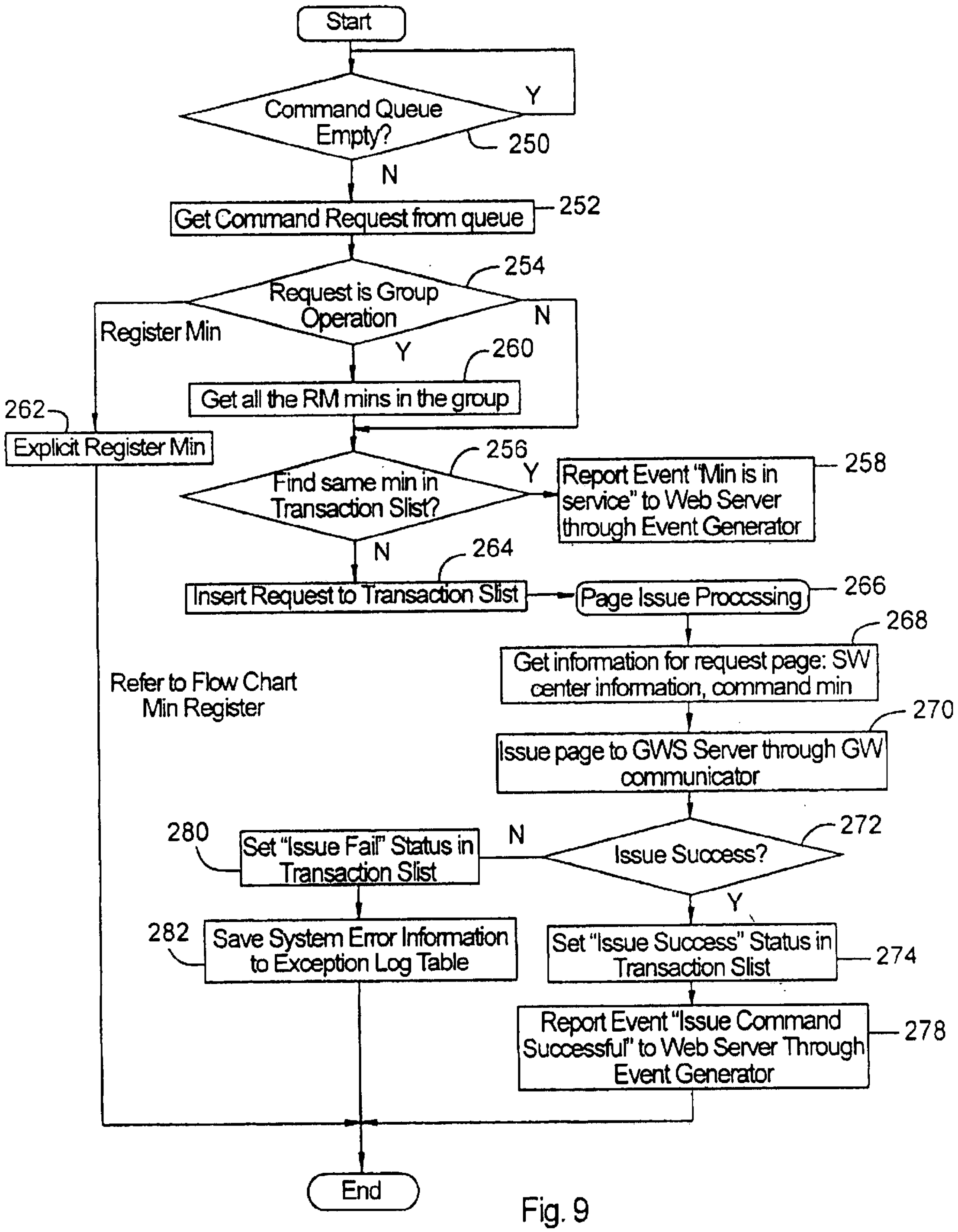
FIG. 9 is a software flow diagram illustrating, by way of example, the process by which pages (MIN numbers) are passed to a gateway server.
Figures 1, 9A:
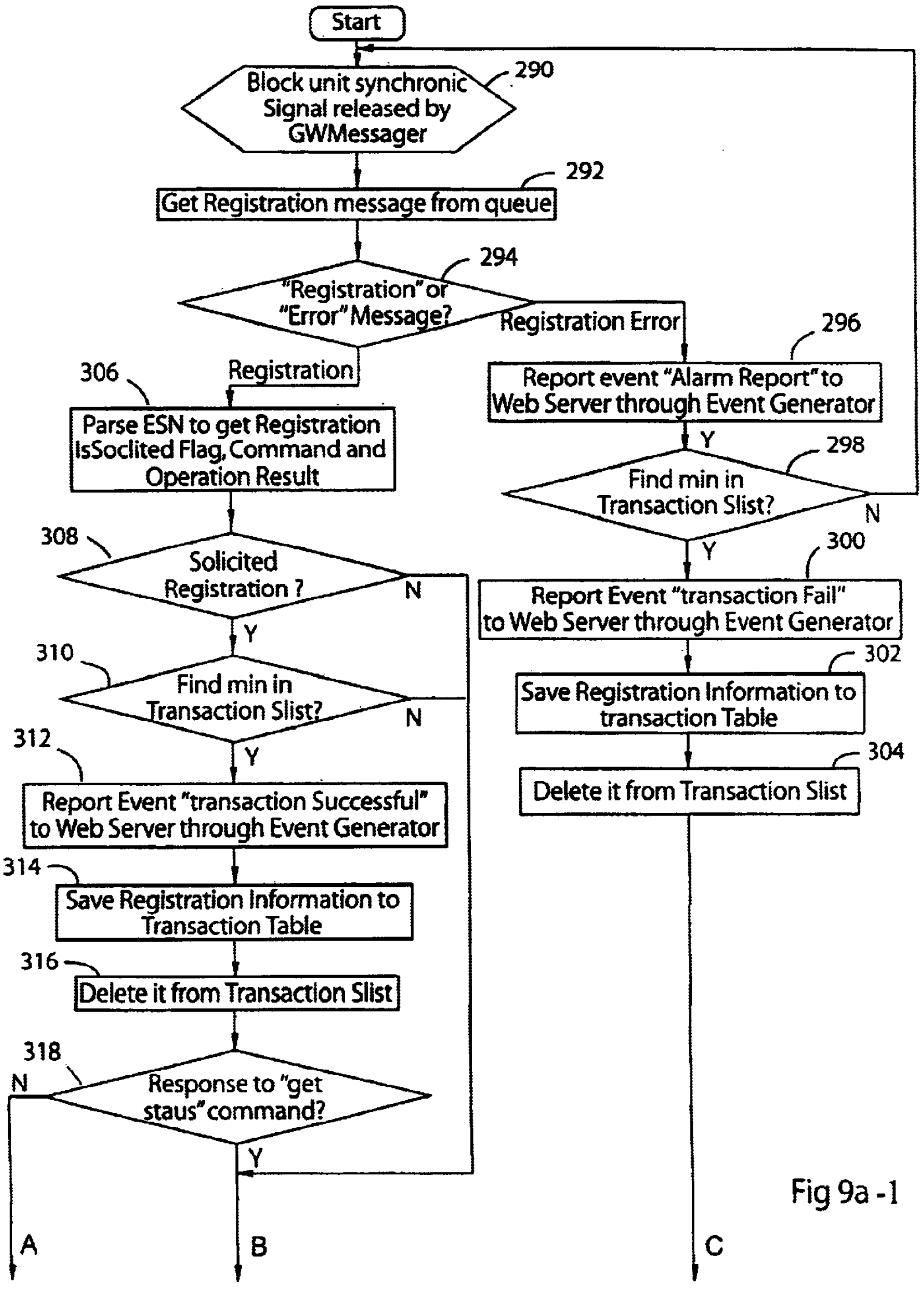
Figures 2, 9A:
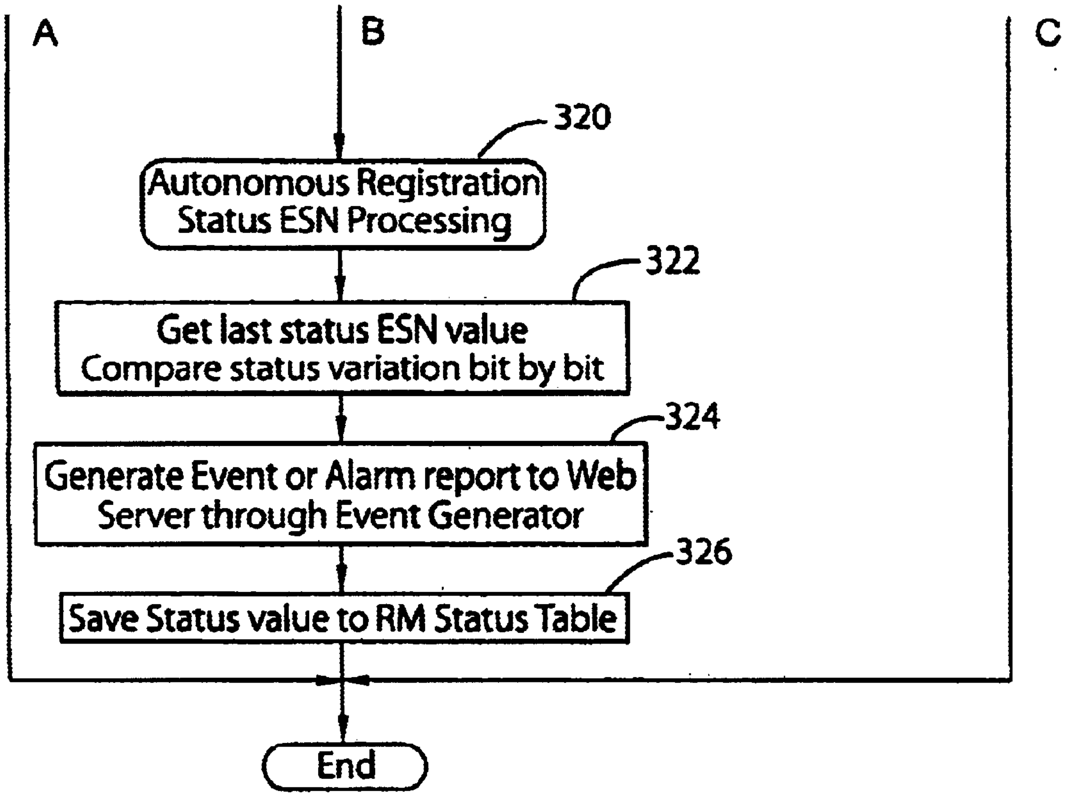

FIG. 9 is a flowchart of one method by which pages may be issued by the page issuer thread 232 initialized in FIG. 8. At box 250 the query is made as to whether the command queue 88 (FIG. 5) for issuing commands to the heater remote modules is empty or if commands are present in the queue. In the instance where the command queue is empty, the program simply loops back to ask the question again. If the command queue is not empty, as indicated by a "NO" answer, meaning that at least one command is in the queue, such as a command to energize or deenergize a remote heater module, to read a meter or get status information from a remote module, then the command request is retrieved by web messenger 89 from the queue at box 252. At box 254 the question is posed as to what type of command has been retrieved. If the command is an individual command, i.e. a command to a discrete remote module, such as to energize or deenergize a specific railroad switch heater or switch a capacitor bank for a utility system, then the program proceeds to box 256 where the question is asked as to whether the same MIN is in the transaction hash table 120, meaning that the remote module is busy processing a previously-issued command. If the MIN is found in the status list of hash table 120, then the answer at box 256 is YES, meaning that the action is in progress. Here, while the action at the remote module takes little time to accomplish, sending the page and receiving an associated registration may require a minute or more. Thus, at box 258 a report is generated via event generator 118 (FIG. 5) indicating that the requested MIN is already being processed, with this report being shown in window 202 (FIG. 7). Similarly, where a group of MINs are requested, as where all switch heaters are to be energized, and one or more are already in process, then corresponding reports are generated through event generator 118. If the command type is a register MIN (box 262), as where a new remote module is added to the system, a MIN number is added to database 78 for the new remote module. In this instance, the new MIN number is added to MIN register 100, which in turn provides it to MIN register 122 where it is passed via gateway communicator 116 and socket manager 132 to hash table 150 of gateway server 76. Where the answer at box 256 is NO, meaning that the transactions are not in progress, then the program falls through to box 264 where the request or requests is/are inserted into the transaction hash table 120. This causes, at box 266, a "PAGE ISSUE" to be initiated that cumulates in the issuance of a page containing the command MIN. At box 268 the command MIN is obtained along with switching center information for the requested page by page issuer 92, and at box 270 the page is issued to gateway server 76 via gateway communicator 116. At box 272 the query is made as to whether the page was successfully issued, as by reception of an acknowledgement signal from the cellular system, and if so then at box 274 "ISSUE SUCCESS" is associated with the respective MIN in hash table 120. At box 278 "ISSUE COMMAND SUCCESSFUL" is reported to web server 70 through event generator 118, which reports a successful issue of the command in box 202 (FIG. 7), and the program exits. If the issued command was not successful at box 232, then at box 280 "ISSUE FAIL" is associated with the MIN number in hash table 120 and at box 282 error information is saved in an exception log table in database 78. In the instance of a major failure, the failure message may be provided as a pop-of window in FIG. 7, or where the failure is a minor failure the failure message may be associated with a respective one of buttons 200 or provided in status window 202.

FIGS. 9*a–1*and 9*a–2*, which may be connected to form a single flowchart by matching lines A—A, B—B and C—C illustrate, by way of example, one possible logic flow for handling registrations, i.e. the registration handler thread 228 of FIG. 8. Generally, this logic flow describes how registration data is obtained from a registration queue, the data being parsed and reports generated containing, where appropriate, an error message, ESN data, status information and the status, alarm or other message saved in database 78. More specifically, at box 290 the registration is buffered in registration queue 112, and gateway server 76 notifies registration handler 106 by a synchronic signal that a registration is waiting to be picked up, at which point the registration message is obtained by gateway server messenger 110 at box 292. At box 294 the query is posed as to whether or not the message is a registration message or an error message. In the instance where the message is a registration error message, then at box 296 the event "ALARM REPORT" is reported to web server 70 via event generator 118. As described, the error message may be displayed in status window 200 (FIG. 7), a pop-up window or be associated with an icon. At box 298 the inquiry is posed as to whether or not the MIN number is found in hash table 120. If so, then at box 300 "TRANSACTION FAIL" is reported to web server 70 via event generator 118 and an event is reported, as by displaying a message in status window 202.

At box 302 the registration information is saved to a transaction table in database 78, and at box 304 the registration error message is deleted from the transaction status list (a data structure in hash table 120). Where the answer at box 298 is NO, then the program returns to the beginning to run again at box 290. As stated, this logic module runs in an endless loop. If, at box 294 a registration was received instead of an error, then at box 306 the ESN number is parsed by gateway server messenger 110 to obtain registration information, i.e whether the command was solicited or unsolicited, the corresponding command type and operation result. At box 308 the question is asked as to whether the registration was solicited, and if so then at box 310 the question is asked whether the corresponding MIN that solicited the registration is located in transaction hash table 120. If so, then at box 312 "TRANSACTION SUCCESSFUL" is reported to web server 70 via a calling function in event generator 118. At box 314 the registration information, i.e. time that the registration was received, status, ESN result, exception, etc., is saved to the transaction table in database 78, and at box 316 the MIN number that solicited the registration is deleted from hash table 120 and the program falls through to inquiry box 318. At box 318 the question is posed as to whether the registration was solicited or unsolicited, i.e. response to "get status", and if the registration was unsolicited then the logic falls through to box 320. Where the answer at either of box is 308 or 310 is no, meaning that the registration was not solicited or the MIN number was not found in hash table 120, then the program also loops to box 320 where autonomous registration status electronic serial number (ESN) processing occurs for an unsolicited registration. Here, all registrations have a status field, with the status bits being compared with previous status indications and if different a corresponding alarm generated. At box 322, the ESN value of the registration is compared, bit by bit, with the ESN value retrieved from database 78. If there is a bit change then at box 324 an alarm is generated and sent to web server 70 to be displayed. At box 326 the new status value is saved in database 78. Where the answer at box 318 is no, then the program exits and runs again.

Figure 9B:
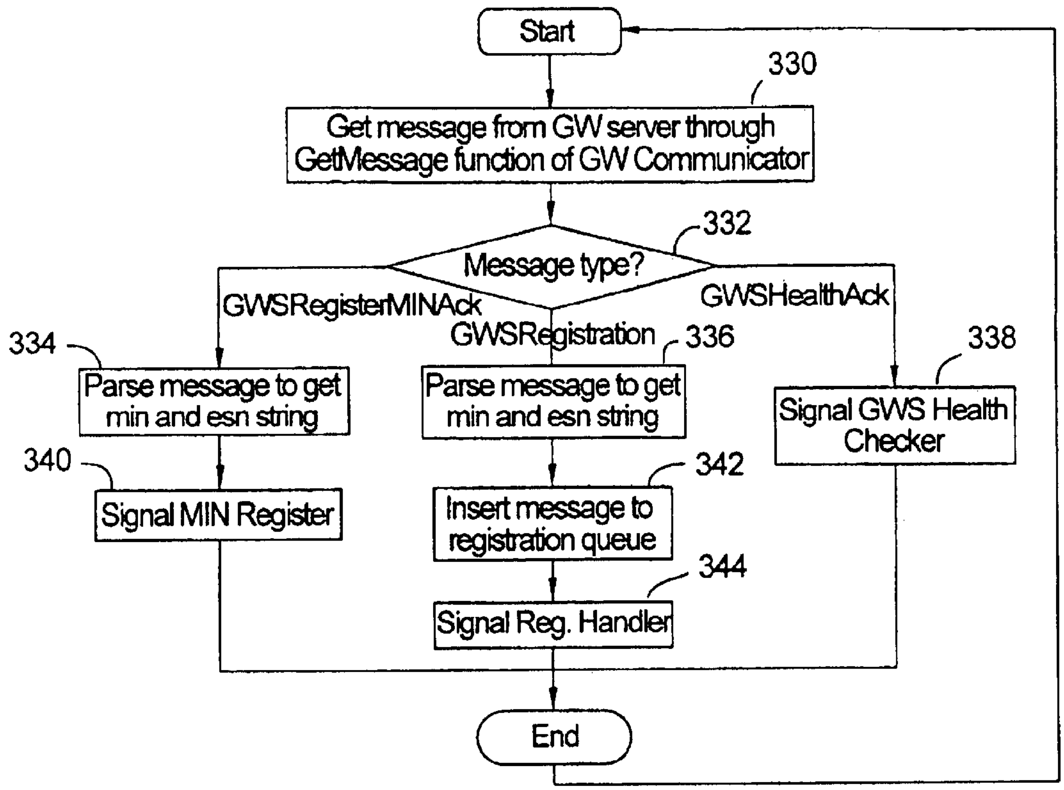
FIG. 9*b* is a software flow diagram illustrating, by way of example, a process of the instant invention by which a gateway messenger functions.

FIG. 9*b* illustrates the process of gateway server messenger 110, which also runs in an endless loop. As stated, this component receives messages from gateway server 76 through gateway communicator 116 and dispatches messages to different modules such as registration queue 112, MIN register 122 and gateway server health checker 126, each of which subsequently performing their respective functions. At box 330 messages are obtained from gateway server 76 via the "get message" function of gateway communicator 116. At box 332 the question is asked as to what type message has been obtained. For a gateway server register MIN ack message, the logic flows to box 334, for a gateway server registration the logic flows to box 336, and for a gateway server health acknowledgement signal the logic flows to box 338. At box 334, the register MIN ack signal is parsed to obtain the MIN number and ESN string, and at box 340 the MIN register is signalled to indicate that the gateway server register MIN ack message has been received, after which the program exits. At box 332 where the message type is a gateway server registration, the message is parsed at box 342 to obtain the MIN and ESN strings. At box 342 the message is inserted into registration queue 112, and at box 344 registration handler 106 is signalled to indicate that there is a message in queue 112, after which the logic exits. At box 338 the gateway server health checker is signaled to indicate an acknowledgement signal has been received, indicating that the gateway server is up and running correctly. After boxes 340, 344 and 338 the logic flow exits.

Figure 9C:
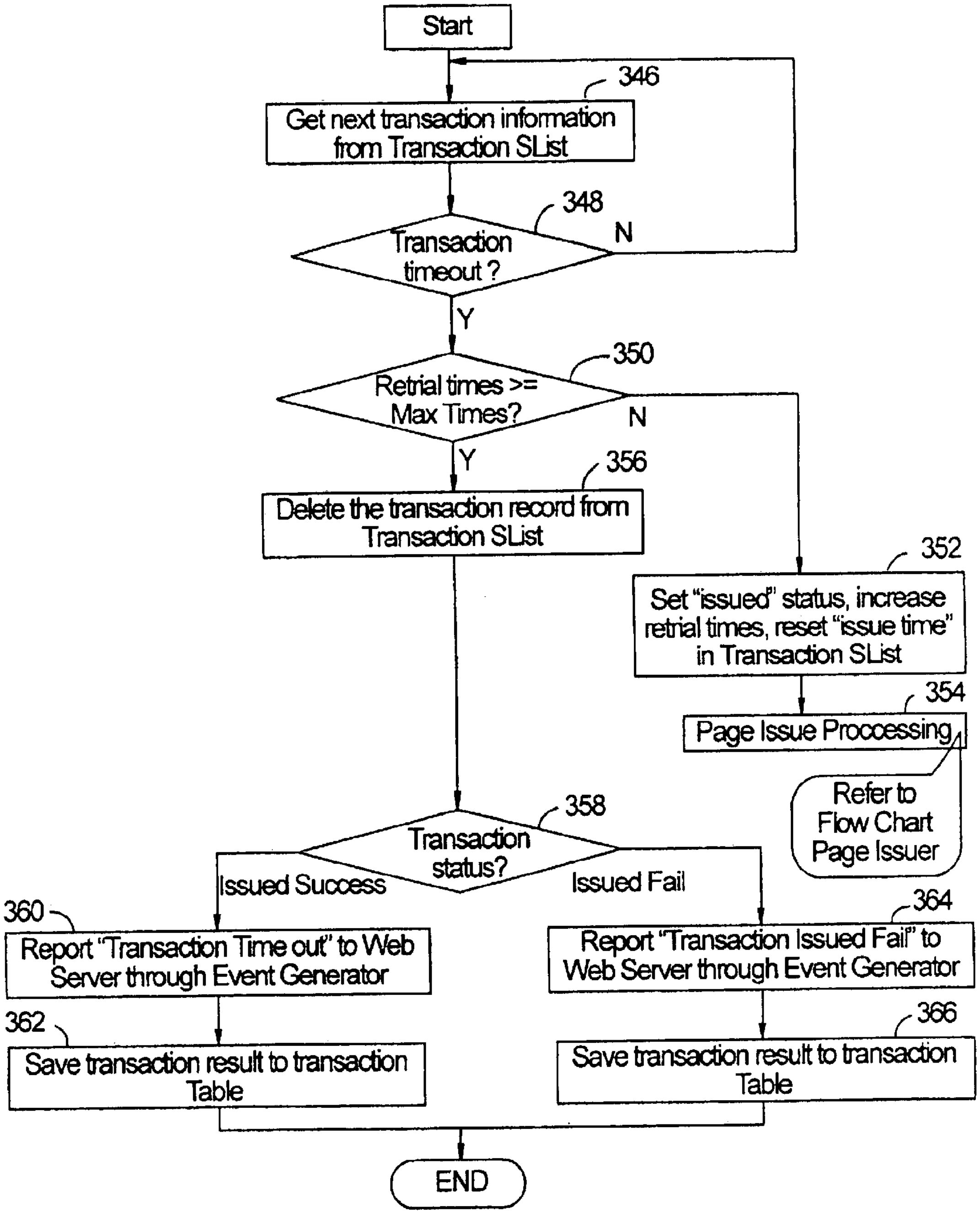
FIG. 9*c* is a software flow diagram illustrating, by way of example, a process of the instant invention for tracing transactions.

FIG. 9*c* depicts a flowchart relating to insertion of event messages into event queue 98. Again, this logic runs in an endless loop, and occurs when registration handler 106 generates an alarm, event or transaction message. The logic may also be called by page issuer 92, diagnosis engine 114, health center 119, or MIN register 122 whenever these components detect an error. As shown, at box 346 transaction information for the next transaction to be performed is obtained from hash table 120. Where there are a number of transactions to be acted upon, the next action may be selected using the priority scheme as described. At box 348 an inquiry is made as to whether the transaction has timed out, such as when the two minute delay has expired after a page is issued. If the transaction has not timed out in the logic flow loops back to box 346 to obtain the next transaction from hash table 120. Where the transaction has timed out, then at box 350 the question is asked as to whether the maximum number of retries for the transaction has occurred, as where an attempt to send a page to gateway server 76 has been retried twice. If the maximum number of retries has occurred, then at box 356 the transaction is deleted from hash table 120 and the logic falls through to box 358 where the inquiry is made as to whether or not the transaction was issued. If the transaction issued, then at box 360 a report "transaction timeout" is sent to web server 70 via event generator 118 and a message is displayed in window 202 indicating that the transaction issued but received no response. The transaction result is saved in a transaction table in database 78. If, at box 358 the transaction was not issued, then at box 364 the report "transaction issue failed" is sent to web server 70 via event generator 118, with an appropriate message displayed in window 202 or a pop-up warning being triggered. This failed transaction result is saved at box 366 in the transaction table. If, at box 350 the maximum number of retries has not occurred then at box 352 the "issued" status is set in the status field of the transaction in hash table 120, a counter indicating the number of retries is incremented by one and the time delay in the hash table for the page is reset to two minutes. At box 354 the page is reprocessed as shown in FIG. 9.

Figure 9D:
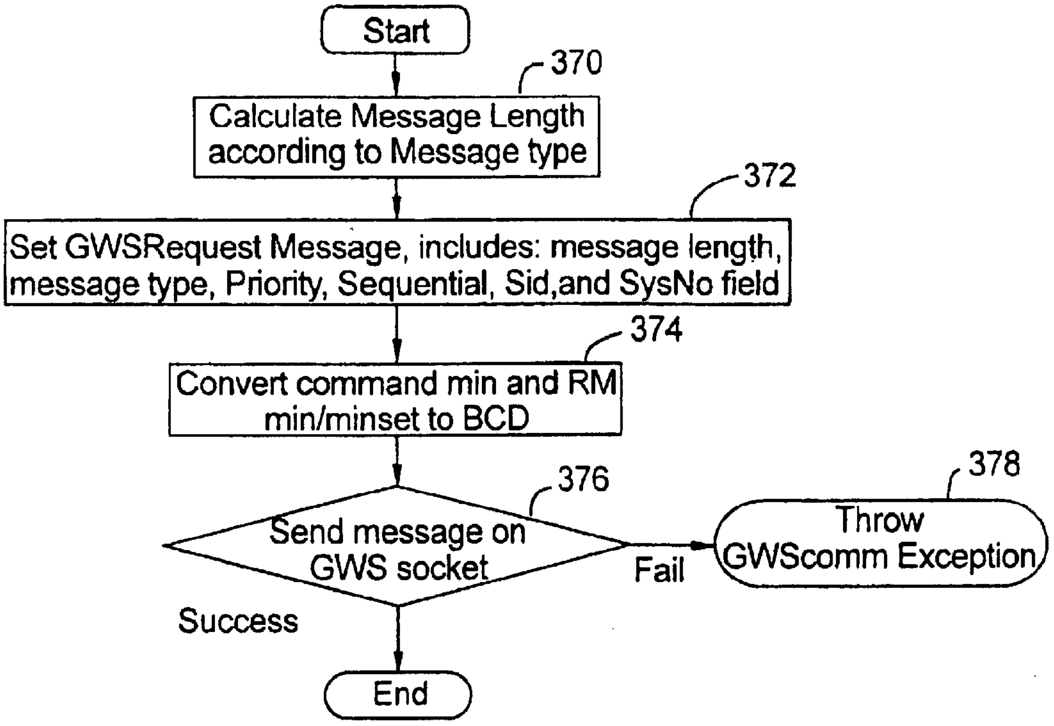
FIG. 9*d* is a software flow diagram illustrating, by way of example, operation of a gateway communicator of the instant invention.

FIG. 9*d* illustrates logic for a functional interface for the remote module server 74 to send pages and receive registrations to and from gateway server 76. Here, at box 370, a message length is calculated according to the message type, i.e. as different type messages may have different length, the length of the message is calculated and memory for the message allocated accordingly. At box 372 the gateway server request message is assembled in the allocated memory, and includes message length, message type, priority, sequential, SID and SYSNO field. Here, with respect to respective positions in fields of the message, priority=1 may represent a high priority level, while priority=0 may represents a low priority level. "Sequential" indicates whether the pages in a transaction are to be issued in sequence or not. Sequential=true may require the gateway server to keep the sequence of the pages in the MIN transaction of in order, while "sequential=false" does not. SID is the mobile switching center system identification number, and is used by the gateway server to construct and route outgoing packets. Thus, all pages in the MIN set for an area served by a common mobile switching center share the same SID. SYSNO defines the mobile switching center switch number, i.e. which service provider, and is also used by the gateway server to construct and route outgoing packets. All pages in the MIN set share the same SYSNO. At box 374 the command MIN and RM MIN/MINSET are converted to binary coded decimal format and at box 376 the query is made as to whether or not to send the page or transaction to the gateway server socket. If the answer is fail, then an exception is developed at box 378 and a corresponding message displayed in box 202. If the answer is success, the page is sent to gateway server 76 and the program loops back to the beginning in an endless loop.

Figure 9E:
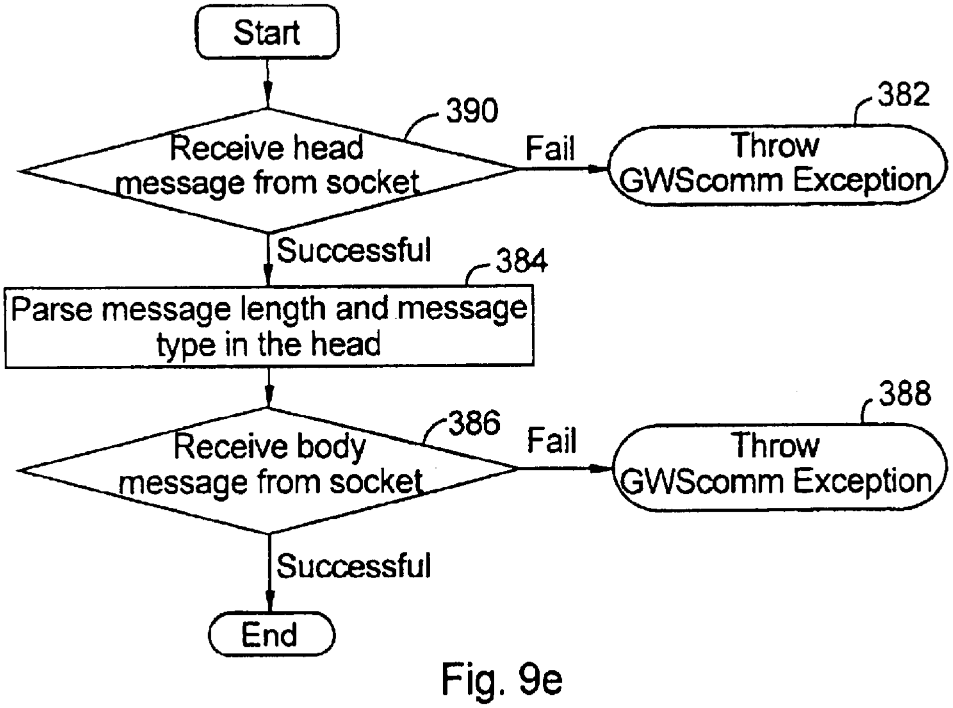
FIG. 9*e* is a software flow diagram illustrating, by way of example, another process of the instant invention by which the gateway communicator functions.

FIG. 9*e* shows logic flow that develops error codes when one or more of a plurality of errors occur. These errors may include gateway internal errors such as buffer overflow, authentication failure, and others related to the gateway server. Other failures that develop error codes are a general modem error, sequence rejected due to an invalid MIN number, an invalid switch ID, an invalid switch number, a bad sequence, an excessive number of dial retries, an excessive number of modem retries, a connection failure, no TLDN allocated (no available modem) and an IS page failure. In the flowchart, at box 380 the header message is received from the remote unit, and the question is asked as to whether reception of the message was successful or unsuccessful. If reception was unsuccessful, then at box 382 a GWS COMM exception is developed, and notification is provided with respect to this error. If reception was successful, then at box 384 the message length and type are read. At box 386 the question is asked whether the body of the message was received, and if not then at box 388 a GWS COMM exception is developed, and notification is provided. If reception of the body is successful, then the program exits and runs again from the beginning.

FIG. 9*f* is a flowchart representative of logic flow of remote object calling for web server 70 to register or unregister a single or a batch of MINs in the gateway server. Accordingly, at box 390 all the remote MINs, in BCD format, that belong to the service, such as the railroad switch heater control system, are retrieved from database 78 and buffered in MIN register 122. At box 392 the MIN numbers are sent to gateway server 76 through gateway server communicator 116. To remove the MIN numbers from the gateway server, the same path is used as when a new MIN number is registered. At box 394 a wait period is initiated in order to receive a signal by gateway server message 110, such signal indicating that the gateway server register MIN ack signal was received. When this signal is received, at box 396 the message "register RM MINS successfully" is returned, meaning that the MIN numbers were successfully registered in gateway server 76. A corresponding message is displayed in window 202. If the ack message is not received then the logic falls through to box 397 where a retry occurs, this retry looping back to box 392. After three retries, the logic falls through from box 397 to box 398 where the error message "register RM mins fail" is stored in an exception log table, and at box 400 "register RM mins fail" is returned and displayed in box 202 (FIG. 7).

FIG. 9*g* is a block diagram of logic flow called by page issuer 92 when web server 70 gets a new MIN to add to the system or a command to delete a MIN from the system, and put the message "add MIN/delete MIN in the command queue. Here, the path to register the new MIN is through operational control 86, command queue 88, web messenger 89 and through transaction hash table 120 to MIN register 122. At box 410 the message "send gateway server register MINs/gateway server unregister MINs" is sent to gateway server 76 through gateway communicator 116. At box 412 a wait period is introduced in anticipation of reception of an acknowledgement signal from gateway server messenger 110, meaning that the gateway server MIN register/unregister signal was received, at which point at box 414 a "register/unregister RM MINs successful" message is returned. If the acknowledgement signal was not returned, then at box 416 the program loops back to box 410 and the processes of boxes 410 and 412 are retried up to three times. After three trials, at box 418 "register/unregister RM MINs fail" is saved to the exception log table and at box 420 the message "register/unregister RM MINs fail" is returned to be displayed in box 202.

As stated, my system may be easily adapted to multiple applications in addition to railroad switch heating systems simply by connecting a CELLEMETRY™ radio, and in some instances a GPS receiver, to an appropriate sensor. Some of such applications include automatic meter reading and prepaid utilities systems, surveillance systems of all types where an individual is not actually watching a monitored area, personal security and location devices, control and monitoring of systems such as capacitor banks for power factor balancing, quickly determining areas effected by electrical power outages and others, as should be apparent to one skilled in the arts from my disclosure.

Having thus described my invention and the manner of its use, it should be apparent to those skilled in the arts that incidental modifications may be made thereto that fairly fall within the scope of the following appended claims, wherein I claim:

1. A control system comprising:

a plurality of remotely located electrical switches wherein each remotely located electrical switch of said plurality of remotely located electrical switches performs a function of a separate, discrete system, at least one parameter of said separate, discrete system monitored by said control system, said control system comprising:

a cellular receiver and a cellular transmitter configured for communicating over control channels of a cellular network, a microcomputer coupled to said cellular receiver and said cellular transmitter, and to a respective said remotely located electrical switch, a sensor associated with said at least one parameter, said sensor coupled to said microcomputer, said microcomputer responsive to incoming cellular signals received by said cellular receiver, and providing outgoing cellular signals to said transmitter, said incoming cellular signals and said outgoing cellular signals containing data associated with said remote electrical switch and said sensor, respectively, a cellular link to the Internet, a data center coupled to the Internet and configured for receiving said data from the Internet and transmitting said data to the Internet, a user interface in said data center responsive to said data from said cellular transmitter and for inputting said data to said cellular receiver, and providing control and monitoring of said plurality of remote electrical switches and said at least one parameter from said sensor.

2. A control system as set forth in claim 1 wherein said sensor includes said switch so that status of said switch is monitored.

3. A control system as set forth in claim 1 wherein said separate, discrete system further comprises groups of subsystems, each group of said groups of subsystems comprising at least one said remote electrical switch of said plurality of remote electrical switches and at least one said sensor, with a said cellular transmitter, a said cellular receiver and a said microprocessor coupled to monitor and control an associated said group.

4. A control system as set forth in claim 3 wherein said user interface further comprises a display of controls for said remote electrical switches and indications of said parameters organized so that said a said control for said switch and a said parameter associated with a said group containing said switch are correspondingly identified and grouped together on said display.

5. A control system as set forth in claim 3 wherein said remote electrical switch and said sensor in each said group of said groups of subsystems are identical, with said microprocessor programmed to respond to a first unique cellular transmission from said control center and initiate a second unique cellular transmission to said control center.

6. A control system as set forth in claim 5 wherein said first unique cellular transmission energizes or wakes up said microprocessor and a following cellular data transmission from said control center provides instructions to said microprocessor.

7. A control system as set forth in claim 6 wherein said first unique cellular transmission is in the form of a MIN number and said following cellular data transmission is in the form of a MIN number, and said instructions cause a change of state of said switch.

8. A control system as set forth in claim 7 wherein said second unique cellular transmission is in the form of an electronic serial number of said cellular transmitter, said electronic serial number including information related to said sensor.

9. A control system as set forth in claim 8 wherein said separate, discrete system is a railroad switchyard comprising a plurality of railroad switches, each railroad switch of said plurality of railroad switches equipped with a pair of heaters for melting snow and ice, with a pair of energizing/deenergizing switches, each switch of said pair of energizing/deenergizing switches coupled to energize and deenergize a respective heater of said pair of heaters responsive to said incoming cellular signals, and a pair of ON/OFF sensors, each sensor of said pair of ON/OFF sensors coupled to sense an energized or deenergized state of a respective said heater of said pair of heaters, each of said sensors providing an indication of said energized or deenergized state of a respective said heater to said microprocessor whereupon said indication is transmitted to said data center.

10. A control system as set forth in claim 9 wherein a single said group of said railroad switchyard comprises a said railroad switch, an associated said pair of heaters, an associated said pair of sensors, an associated said cellular transmitter and associated said cellular receiver and an associated said microprocessor.

11. A control system as set forth in claim 9 wherein said user interface in said data center provides a control for energizing and deenergizing each said pair of railroad heaters, either separately or together, and said parameter is an indication of said energized or deenergized state of each said heater as provided by a respective said sensor.

12. A control system as set forth in claim 11 wherein said sensor includes a sensor for monitoring an electrical current condition in each said heater wherein current flowing in each said heater is sampled to determine an overcurrent or undercurrent condition in each said heater.

13. A system for energizing and deenergizing railroad switch heaters from a remote location and providing at least an indication of an energized or deenergized state of each said railroad switch heater, said system comprising:

an electrical switch for each said switch heater, said electrical switch coupled to connect and disconnect electrical power to a respective said switch heater, and responsive to an electrical CONNECT signal and an electrical DISCONNECT signal to either connect or disconnect said electrical heater, at least one CONNECT/DISCONNECT sensor for each said electrical switch for providing at least an indication of an energized or denergized state of a respective said switch heater, a cellular transmitter and a cellular receiver, a microprocessor responsive to said cellular transmitter and to said cellular receiver, and coupled to said electrical switch to trigger said electrical switch to a connected or disconnected state responsive to received cellular signals containing either a said CONNECT signal or a said DISCONNECT signal from said cellular receiver.

14. A system as set forth in claim 13 wherein said remote location further comprises a computerized data center coupled to the Internet for relaying said CONNECT signal or said DISCONNECT signal.

15. A system as set forth in claim 14 wherein said data center further comprises a computer system including computer monitors upon which displays relating to status and operation of each said electrical switch and status and operation of each said electrical heater are monitored.

16. A system as set forth in claim 15 wherein said cellular transmitter and said cellular receiver communicate via control channels of the cellular system.

* * * * *